United States Patent
Sotiropoulos

(10) Patent No.: US 10,885,248 B1
(45) Date of Patent: Jan. 5, 2021

(54) METHOD FOR MODELING GLITCHES DURING CIRCUIT SIMULATION

(71) Applicant: Synopsys, Inc., Mountain View, CA (US)

(72) Inventor: John Sotiropoulos, San Francisco, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/352,681

(22) Filed: Mar. 13, 2019

Related U.S. Application Data

(60) Provisional application No. 62/643,194, filed on Mar. 15, 2018.

(51) Int. Cl.
*G06F 30/30* (2020.01)
*G06F 30/3312* (2020.01)
*G06F 30/367* (2020.01)

(52) U.S. Cl.
CPC ........ *G06F 30/3312* (2020.01); *G06F 30/367* (2020.01)

(58) Field of Classification Search
CPC ...... G06F 12/0207; G06F 12/04; G06F 13/16; G06F 13/28; G06F 12/0607; G06F 9/3867; G06F 9/4494; G06F 13/1673; G06F 13/1689; G06F 11/261; G06F 13/38; G06F 15/00; G06F 17/14; G06F 17/142; G06F 2111/04; G06F 2111/20; G06F 2117/02; G06F 30/33; G06F 30/3323; G06F 30/394; G06F 3/14; H04N 21/2383; H04N 19/60; H04N 21/6168; H04L 65/1026;

(Continued)

(56) References Cited

U.S. PATENT DOCUMENTS

| | | |
|---|---|---|
| 5,838,947 A | 11/1998 | Sarin |
| 6,141,631 A | 10/2000 | Blinne et al. |
| 6,321,366 B1 | 11/2001 | Tseng et al. |

(Continued)

OTHER PUBLICATIONS

Favalli, M. et al., article entitled "Analysis of glitch power dissipation in CMOS ICs", ISLPED '95 Proceedings of the 1995 Int'l. Symposium on Low Power, pp. 123-138, Apr. 1995.

(Continued)

*Primary Examiner* — Binh C Tat
(74) *Attorney, Agent, or Firm* — Bever, Hoffman & Harms, LLP

(57) ABSTRACT

Glitch propagation is modelled during circuit design simulation by determining the input duration of each signal pulse received by a cell, utilizing the input duration to distinguish whether the input pulse is a glitch or a valid data signal pulse, assigning a cell-type-specific scaling factor value to each signal pulse identified as a scalable glitch, calculating a scheduled output duration by multiplying the scaling factor value and the input duration, and controlling the cell by scaling (i.e., limiting or reducing) the duration of a corresponding output pulse signal to the scheduled output duration. Each cell-type-specific scaling factor value corresponds to observed glitch decaying effect characteristics of corresponding cells in physical IC devices. A simulation tool automatically assigns glitch scaling modules to each cell of a circuit design, whereby the glitch scaling process is performed on each cell during simulation.

18 Claims, 7 Drawing Sheets

(58) Field of Classification Search
CPC ..... H04L 65/1036; H04L 12/10; H04L 43/00; H04L 43/067; H04L 43/0858; H04L 43/0864
USPC .................................................. 716/110–117
See application file for complete search history.

(56) References Cited

U.S. PATENT DOCUMENTS

| | | | |
|---|---|---|---|
| 7,809,542 | B2 | 10/2010 | Bazinet et al. |
| 9,817,433 | B2 | 11/2017 | Talupuru et al. |
| 2005/0268265 | A1* | 12/2005 | Ly ....................... G06F 30/3312 716/108 |
| 2011/0313738 | A1* | 12/2011 | Stamoulis ............. G06F 30/367 703/2 |
| 2015/0161310 | A1* | 6/2015 | Drasny ............... G06F 30/3312 716/102 |

OTHER PUBLICATIONS

Benini, Luca et al., article entitled "Glitch Power Minimization by Selective Gate Freezing", IEEE Transactions on Very Large Scale Integration (VLSI) Systems, vol. 8, No. 3, Jun. 2000, 12 pages.

* cited by examiner

METHOD FOR MODELING GLITCHES DURING CIRCUIT SIMULATION

RELATED APPLICATIONS

This application claims priority from U.S. Provisional patent application 62/643,194, entitled "GLITCH SCALING—AN IMPROVED METHOD FOR MODELING GLITCHES IN DIGITAL CIRCUIT SIMULATION", which was filed on Mar. 15, 2018, and is incorporated by reference herein.

FIELD OF THE INVENTION

The present invention generally relates to Electronic Design Automation (EDA) software tools utilized to develop integrated circuit (IC) designs prior to the fabrication of IC devices that are based on the IC designs. More specifically, this invention relates to simulation tools utilized by EDA software tools to perform power consumption analysis that is utilized to enhance power consumption characteristics (e.g., to lower power consumption) of IC designs during circuit design development.

BACKGROUND OF THE INVENTION

Due to the ever-increasing complexity of new IC devices, EDA software tools are now considered essential in the process of converting each new electronic system idea into a corresponding integrated circuit (IC) device using one or more IC "chips". IC designers utilize EDA tools to develop an initial circuit design (i.e., software-based description of an IC device) that they believe is capable of implementing a new electronic system idea, to analyze and modify the initial circuit design in order to verify that the final design performs the operational objectives set for the electronic system idea, and then to generate and check a series of IC layouts (aka mask designs or mask layouts) that define a physical IC chip capable of implementing the final circuit design. Because modern IC devices, such as System-on-Chip (SoC) devices, can comprise billions of individual circuit components, there is no practical way to develop and produce modern IC devices without the use of EDA tools.

Many EDA software tools include sub-tools that generate power consumption estimations, which are then used to optimize the power consumption characteristics of the pre-silicon circuit designs. Low power consumption constraints are often given comparable weight as other design flow (metrics such as high-speed computation performance, small silicon area, and short time-to-market scheduling due to the demand for low power consumption in mobile devices to preserve battery life, and more recently in non-battery-operated devices for purposes of circuit reliability and costs associated with packaging and cooling solutions. To meet this increased emphasis on power consumption, digital simulation tools are utilized to estimate (predict) the power consumption of a post-fabrication (physical) IC device by simulating operation of the associated software-based circuit design, whereby the estimated power consumption data can be used to optimize the circuit design to meet power consumption constraints before incurring the time delay and high cost of fabrication.

Conventional digital simulation tools utilized to perform pre-silicon power consumption estimation that are in use today typically utilize a logic simulation/emulation tool along with a power calculator. Early digital simulation tools utilized traditional circuit design simulation techniques to perform power estimation, which arguably provides the most accurate estimation of actual silicon measurements, but the runtime and memory capacity required to perform traditional circuit design simulation can no longer support the complexity of today's SoC devices. To address this problem, the simulation tools provided in many of today's EDA software tools perform functional simulation processes (e.g., gate-level, Standard Delay Format-annotated (SDF-annotated) digital circuit simulations) that measure switching activity and provide data in the form of toggle count values. That is, each unit (toggle) of a toggle count represents a quantity of power consumed when a given cell undergoes a switching operation (e.g., changes its output state, thereby generating a signal edge or signal pulse that is transmitted on a signal path to another cell), whereby total power consumption of the given cell can be determined using pre-measured power consumption amounts. For example, when the input signal to an inverter changes from low (e.g., 0V) to high (e.g., 1V), the inverter undergoes a switching operation to change its output from high to low. The inverter's toggle count is determined by detecting and counting the number of switching operations performed by the inverter during a power simulation session, and total power consumption of the inverter can then be calculated by multiplying the inverter's toggle count by a unit power consumption amount determined by measuring previously fabricated inverters having the same size and type of transistors. The total power consumption of a circuit design is similarly estimated by generating a total toggle count including the switching operations of all cells of the circuit design during a simulation period, and by multiplying the toggle count corresponding unit power consumption amounts.

Currently available conventional digital simulator tools utilized to perform pre-silicon power consumption estimation were developed for IC devices fabricated using CMOS and other conventional fabrication technologies in which the amount of power consumed by glitches accounted for a very small percentage of total power consumption. The term "glitch" is a term of art referring to undesired transitions (signal pulses of short duration) that occur before a signal settles to its intended voltage level, some resulting from a fault or design error, and some being unavoidable because not all signals that are part of a design feature will change value at the same time. Glitches typically occur in the presence of a race condition in a digital logic circuit. For example, when a signal is based on two other signals which are based on a common signal, a glitch can occur if there is a delay in the arrival of one of the two signals. Although glitches consume power in physical IC devices just like valid data signal pulses, glitches are largely ignored by current conventional simulation tools that perform conventional pre-silicon power consumption estimation, which are typically developed for IC devices fabricated by CMOS and other conventional fabrication technologies in which current leakage accounts for a substantially larger percentage of total power consumption than glitches. As such, conventional circuit design modifications employed to meet power constraints often focus on reducing the size or changing the type of selected transistors to reduce power consumption. That is, the power consumed by glitches in conventional CMOS devices accounted for a very small percentage of total power consumption, so the rough estimate of glitch-based power consumption provided by some conventional simulation tools was considered adequate.

As fabrication technologies continue to evolve, miscorrelation between pre-silicon power estimations generated by conventional power simulation approaches and post-fabrication (real, physical) silicon measurements is becoming more pervasive and pronounced due at least in part to the use of overly simplified glitch modeling techniques. As mentioned above, current leakage accounts for a larger percentage of power consumed by IC devices fabricated using conventional fabrication technologies such as CMOS. In comparison, modern FinFET fabrication processes produce IC devices that exhibit a significant reduction in the leakage power component of total power consumption, whereby the power consumption associated with other factors, such as glitches, now accounts for a significantly larger percentage of the total power consumption calculation. The overly simplified conventional glitch modeling techniques utilized in conventional digital simulation tools utilized to perform pre-silicon power consumption estimation generally allow a user either to entirely filter out glitches that occur during power simulation, or to entirely propagate glitches that occur during power simulation. Filtering out glitches entirely has been found to produce too-low toggle counts that generate optimistic power consumption estimates, which in turn can result in physical IC devices that do not meet targeted power consumption constraints. Conversely, propagating glitches entirely has been found to produce too-high toggle counts that generate pessimistic power consumption estimates, which in turn increase total manufacturing costs by way of unnecessary over-design and produce release schedule delays. None of the currently available digital simulation tools utilized to perform pre-silicon power consumption estimation implements a conventional glitch modeling technique that includes measuring the duration of each glitch, and therefore none are capable of propagating only a fraction of each input glitch. Moreover, none of the currently available digital simulation tools utilized to perform pre-silicon power consumption estimation takes into account design aware features of a circuit design, such as cell circuit type, slope and load, but instead employ an one-for-all pulse control glitch propagation/filtering approach. Accordingly, currently available digital simulation tools utilized to perform pre-silicon power consumption estimation fail to sufficiently accurately predict glitch power contribution amounts, leading to over-design and/or schedule pushout.

What is needed is a more accurate method for modeling the propagation of glitches to minimize power miscorrelations between pre-silicon power consumption estimation and post-silicon power consumption measurements resulting from conventional glitch modeling approaches. What is particularly needed is a design-aware glitch propagation modeling method that accurately models glitch decaying effects produced by associated cell types of a circuit design. What is also needed is a modified simulation tool capable of implementing the design-aware glitch propagation modeling method without modifying the circuit design source file.

SUMMARY OF THE INVENTION

The present invention is directed to computer-implemented methods for modeling the propagation of certain "scalable" (transport) glitches during simulation of a circuit design, thereby achieving substantially higher toggle count accuracy by way of utilizing a novel glitch scaling process to accurately model a cell-type-specific glitch decaying effect (i.e., a cell's "real world" response to a glitch received on one of the cell's input terminals). The glitch scaling process is performed in each cell that receives a scalable glitch and involves controlling the cell's output such that the duration (pulse width) of the outgoing glitch is proportionally reduced in a way that models the glitch decaying effect. According to an aspect of the invention, each glitch scaling process includes determining the input duration (input pulse width) of each input signal pulse received by a given cell of the simulated circuit design, utilizing the input duration to distinguish glitches from valid data signal pulses, assigning a cell-type-specific scaling factor value to each identified glitch, (optionally) calculating a scheduled output duration using the received glitch's duration and the assigned scaling factor value, and controlling the cell such that the cell generates a scaled output glitch signal at its output node having an associated output duration that is limited to (i.e., equal to or less than) the scheduled output duration. Determining each glitch signal's input duration is achieved, for example, by calculating the time period between the arrival time of the glitch's rising/falling (first) edge and the arrival time of the glitch's falling/rising (second) edge at a given cell's input node. Controlling a given cell to generate the desired scaled glitch signal involves allowing the cell's logic function/circuitry to process the received glitch signal and to generate a corresponding output pulse, but also involves suppressing (truncating) any portion of the logic-generated output pulse that lasts longer than the scheduled output duration. By determining each glitch's input duration, and by controlling the output duration of the corresponding scaled output glitch using the assigned cell-type-specific scaling factor value and the input duration (along with any cell-type-specific delays), the present invention provides a design-aware simulation methodology that is capable of estimating toggle counts with substantially higher accuracy than is possible using conventional glitch modeling approaches. The higher toggle count accuracy provided by the glitch scaling process reduces overall production costs of IC devices by significantly reducing the amount of time and resources expended to satisfy power consumption constraints (i.e., in comparison to that required by conventional glitch modeling approaches).

According to an embodiment of the present invention, the glitch propagation modeling method is implemented by way of temporarily modifying a circuit design (i.e., the modification is only applied during simulation of the circuit design) such that each cell (e.g., each logic gate in an RTL-based circuit description) includes an associated glitch scaling module. In an exemplary embodiment, each glitch scaling module is instantiated (operably coupled) between the associated cell's input and output nodes, and includes a glitch detector that is configured to determine the input duration of signal pulses transmitted to the associated cell's input node, a output duration calculator that is operably configured to calculate the scheduled output duration, and a cell output controller that is operably configured to selectively suppress glitch-type signal pulses that are transmitted from the associated cell's output node. By coupling each glitch scaling module between an associated cell's input and output nodes, the glitch scaling module is configured to operate in parallel with the associated cell's logic function (and a delay element typically assigned to the simulated cell to accurately simulate operating timing of a corresponding physical cell), whereby the glitch scaling module is configured to preserve the associated cell's normal output generation and output signal timing. That is, while the glitch scaling module determines the input duration and scheduled output duration for a received glitch, the associated cell's logic function performs an associated logic operation in response to the glitch and passes the resulting output signal pulse (if any) to delay element, which functions to delay transmission of the resulting signal node to the output node by a predetermined cell-type-specific delay period. By operating in parallel with an associated cell, each glitch scaling module is able to accurately schedule a scaling event (i.e., truncation/suppression of the output signal passed to the output node by the delay element) that is specific to the associated cell's operational and timing characteristics of the associated cell. That is, by utilizing the predetermined delay period of the associated cell to estimate/predict the expected rising (first) edge of the output glitch signal generated in response to a received glitch, the glitch scaling module facilitates generation of the output glitch signal on a schedule determined by the associated cell, and also facilitates controlling the output node such that the output duration of the scaled output glitch signal is limited to the scheduled output duration.

In one embodiment, the glitch detector of each glitch scaling module is configured to determine the input duration of each received signal pulse, and then utilizes the input duration to distinguish scalable glitches from valid data signals or non-scalable glitches. In a presently preferred embodiment, determining each glitch signal's input duration is achieved by detecting a start (first) arrival time of the glitch signal's rising/falling (first) edge at the input node and recording the corresponding start arrival time, detecting an end (second) arrival time of the glitch signal's falling/rising (second) edge at the input node and recording the corresponding end arrival time, and generating the input duration by calculating a difference between the start and end arrival times. In one embodiment, the glitch detector is also configured to distinguish scalable glitches from valid data signals and non-scalable glitches by comparing the input duration with one or more stored glitch duration values. For example, the glitch detector can be configured to distinguish scalable glitches from valid data signals by comparing the input duration with a stored maximum glitch duration value, and the glitch scaling module is configured to disable the module's output suppression function upon detecting a valid data signal (i.e., a signal pulse having input durations longer than the maximum glitch duration value). In a presently preferred embodiment, the glitch detector is also configured to distinguish scalable glitches from non-scalable glitches by comparing the input duration with a stored minimum glitch duration value, and the glitch scaling module is configured to maximize the module's output suppression function to filter-out (entirely suppress) non-scalable glitches (i.e., received signal pulses having input durations shorter than the minimum glitch duration value). By calculating and comparing the input duration with these stored values, the glitch scaling module is able to accurately distinguish and propagate valid data signals without introducing an undesirable delay in the signal path, and also able to reliably distinguish and filter glitch signals in a manner consistent with physical implementations of the corresponding circuit design.

In one embodiment, the output duration calculator of each glitch scaling module is configured to receive the input duration generated by the glitch detector, and to calculate the scheduled output duration by multiplying the input duration with an assigned scaling factor value. In preferred embodiments, a scheduled output duration is generated for all input signal pulses received by a given cell by way of assigning an integer one factor value to valid data signal pulses, assigning an integer zero factor value to non-scalable glitches, and assigning a cell-type-specific fractional (between integer zero and integer one) scaling factor value to scalable glitches. When the input duration is multiplied by the integer one value assigned to input signal pulses that are identified as valid data signal pulses, the resulting scheduled output duration is equal to the input duration, and the suppressing/truncating operation of the glitch scaling circuit is effectively disabled (i.e., the corresponding output signal pulse generated by the cell's logic function is allowed to propagate without suppression or truncation). When the input duration is multiplied by the integer zero value assigned to input signal pulses that are identified as non-scalable glitches (i.e., glitches that are too short to propagate), the resulting scheduled output duration is equal to zero, whereby the suppressing/truncating operation of the glitch scaling circuit is maximized and the resulting output is filtered, (i.e., any signal pulse generated by the cell's logic function is entirely suppressed by the glitch scaling circuit). When a scalable glitch is identified, the input duration is multiplied by a corresponding cell-type-specific fractional scaling factor value, whereby the scaling factor value effectively reflects the percentage-based (fractional) portion of each glitch that is passed by a given cell according to observed glitch decaying effect characteristics. That is, prior to simulation of a circuit design, an associated scaling factor value is generated and stored (saved in accessible memory) for each different type of cell utilized in the circuit design, with the associated scaling factor value being generated in accordance with previously observed glitch decay characteristics of a given cell's type (e.g., the scaling factor value for a particular cell type is generated from glitch decay characteristic data obtained by observing cells of the same particular cell type that were implemented in previously fabricated IC devices, or generated using a cell characterization tool, such as Synopsys' SiliconSmart model generator). During simulation, when each cell is modified to include an associated glitch scaling module, the output duration calculator of each glitch scaling module is linked to an associated stored cell-type-specific scaling factor value such that the scheduled output duration for same-type cells is calculated using a common (same) scaling vector value. By utilizing these cell-type-specific scaling factor values, the present invention accurately models the propagation of glitches that are subjected to glitch decaying effects as they pass through a series of cells in a simulated circuit design.

In one embodiment, the cell output controller of each glitch scaling module functions to suppress output pulse generated in response to scalable glitches at a time determined by a sum of the scheduled output duration and a cell-type-specific delay period such that each cell effectively propagates only a fraction of each received scalable input glitch. With this configuration, the output duration of a given scaled output glitch signal is equal to the scheduled output duration when the leading (first) edge of the given scaled output glitch signal is generated at the expected time (i.e., the arrival time of the leading edge plus the cell-specific delay period).

In a practical embodiment, an EDA software tool includes a simulation tool that performs the computer-implemented simulation methodology of the present invention. In one embodiment, the simulation tool automatically assigns/attaches a glitch scaling module to each cell of a circuit design in the manner described above before performing a simulation process operation, for example, using system Verilog bind statements to avoid modification of the circuit design source files. Each assigned glitch scaling module, which can be implemented (written) in the Verilog programming language using known techniques, is configured to operate in parallel with its associated cell to perform the glitch scaling methodology described above whenever the associated cell receives a scalable glitch (i.e., a signal pulse falling within a user-defined duration range). The assigned glitch scaling modules assigned to different cell types are controlled by associated cell-type-specific scaling factor values, whereby cells of a first cell type (e.g., an inverter) propagate scalable glitches in accordance with an associated first (e.g., inverter-based) cell-type-specific scaling factor value, while cells of a second cell type (e.g., AND-gate) propagate scalable glitches in accordance with an associated second (e.g., AND-gate-based) cell-type-specific scaling factor value. With this arrangement, different glitch decaying effects observed for different cell types are automatically accurately modeled in a new circuit design, thereby greatly reducing the time required to perform a power simulation operation and associated consumption analysis. Accordingly, the EDA software/simulation tool of the present invention overcomes the inaccuracies of conventional glitch modeling approaches by way of (i) automatically modifying each cell of a circuit design to include a glitch scaling module that determines the input duration of each scalable glitch received by a cell, (ii) calculating a cell-type-specific scheduled output duration using the input duration and a cell-type-specific scaling factor value, and (iii) controlling the cell to propagate only a portion/fraction of each received scalable glitch in accordance with the calculated scheduled output duration, whereby the simulation tool provides highly accurate glitch counts by accurately modeling glitch decaying effects observed in physical circuits. By providing these highly accurate glitch counts, the present invention facilitates significantly improved power simulation tools for predicting power consumption by physical circuits based on a simulated circuit design.

This Summary does not attempt to provide the complete significance of any particular innovation, embodiment, or example as it can be used in commerce. Additionally, this Summary is not intended to signify key or critical elements of an innovation, embodiment or example or to limit the scope of the subject matter of this disclosure. The innovations, embodiments, and/or examples found within this disclosure are not all-inclusive, but rather describe the basic significance of the subject matter. Accordingly, one use of this Summary is as a prelude to a Detailed Description presented below. In the Background, Summary, and Detailed Description, headings should not be construed as necessarily limiting. In the Background, Summary and Detailed Description, citation or identification of any publication does not signify relevance or status as prior art for any of the claimed or described embodiments. Italicized text signifies text that is common to multiple patent specifications submitted by the current assignee.

BRIEF DESCRIPTION OF THE DRAWINGS

The following Detailed Description, Figures, appended Additional Figures and appended Claims signify the nature and advantages of the innovations, embodiments and/or examples of the claimed inventions. The Figures signify innovations, embodiments, and/or examples of the claimed inventions for purposes of illustration only and do not limit the scope of the claimed inventions. The Figures are not necessarily drawn to scale, and are part of the Disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

Figure 1:
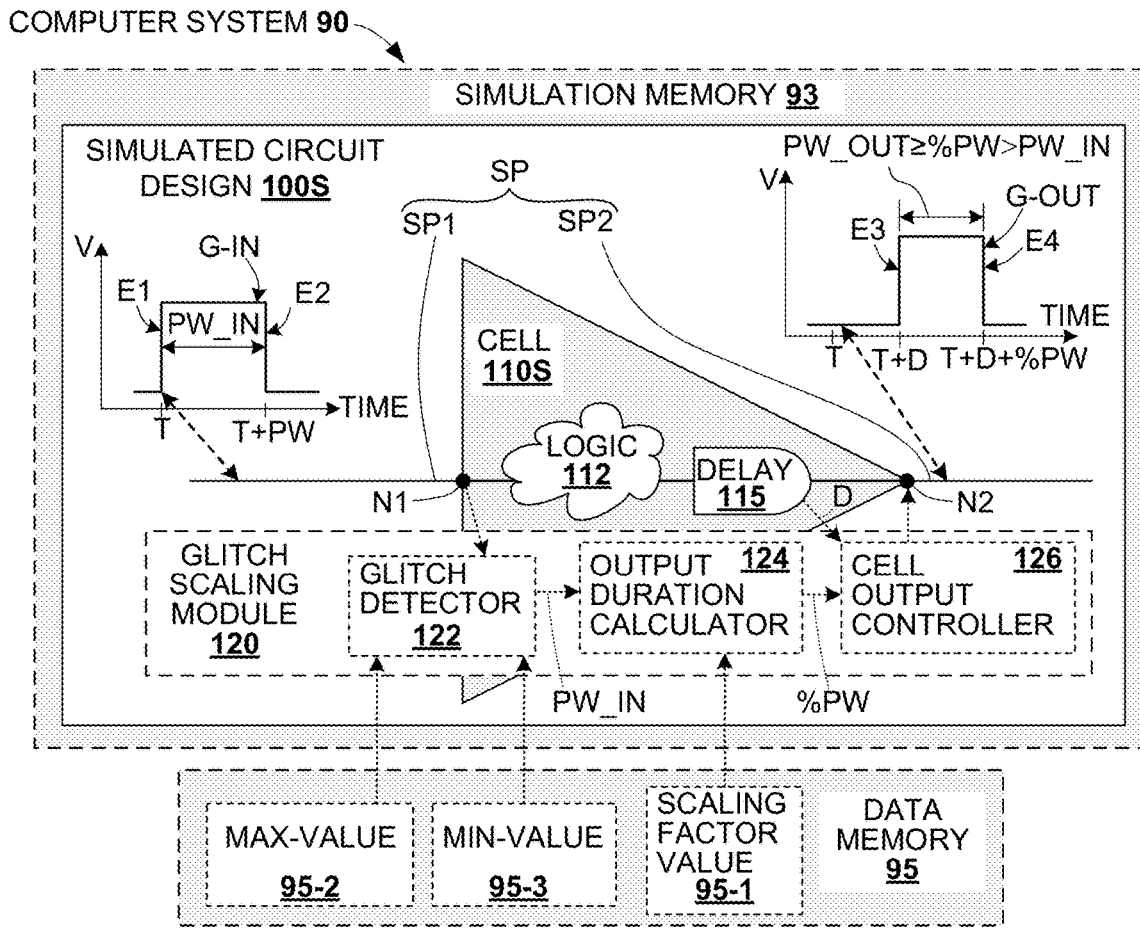
Figure 2:
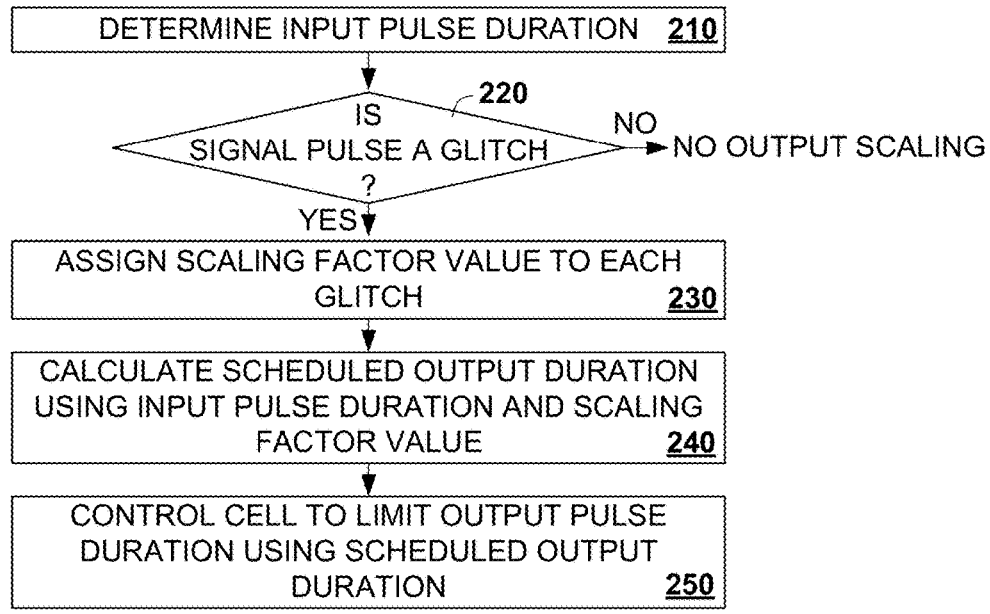
Figure 3:
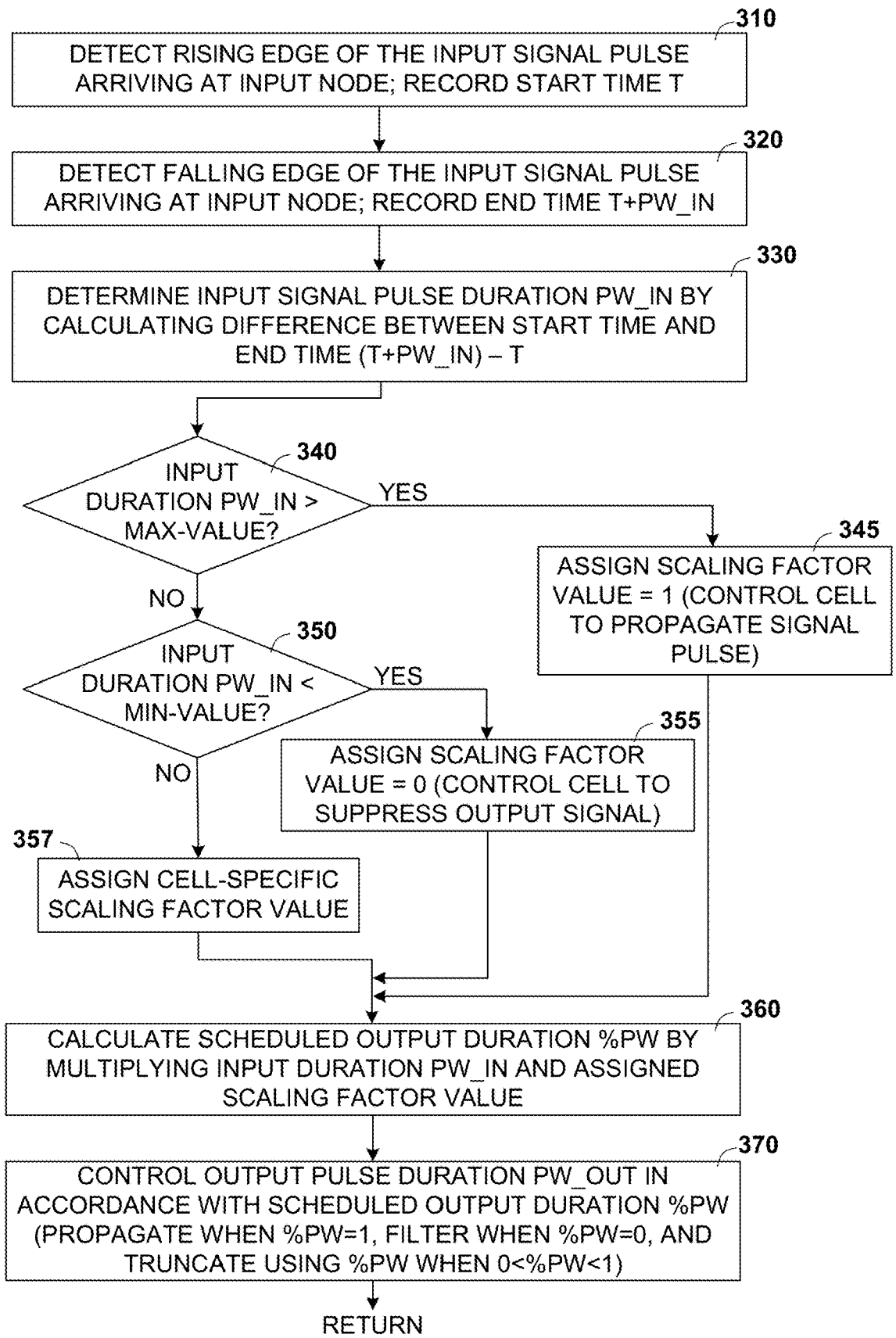
Figure 4A:
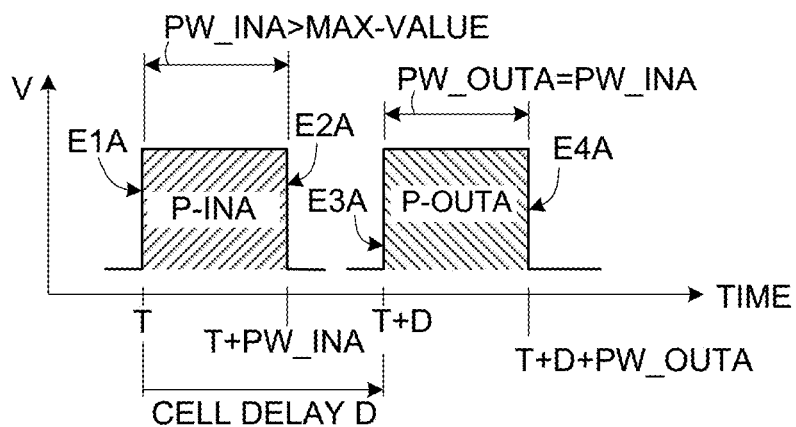
Figure 4B:
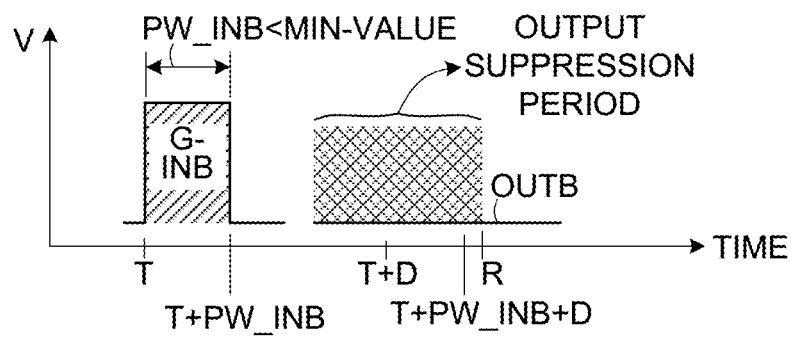
Figure 4C:
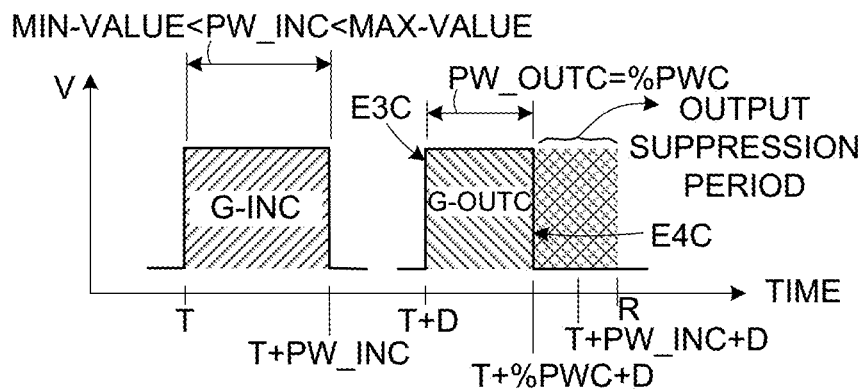
Figure 5:
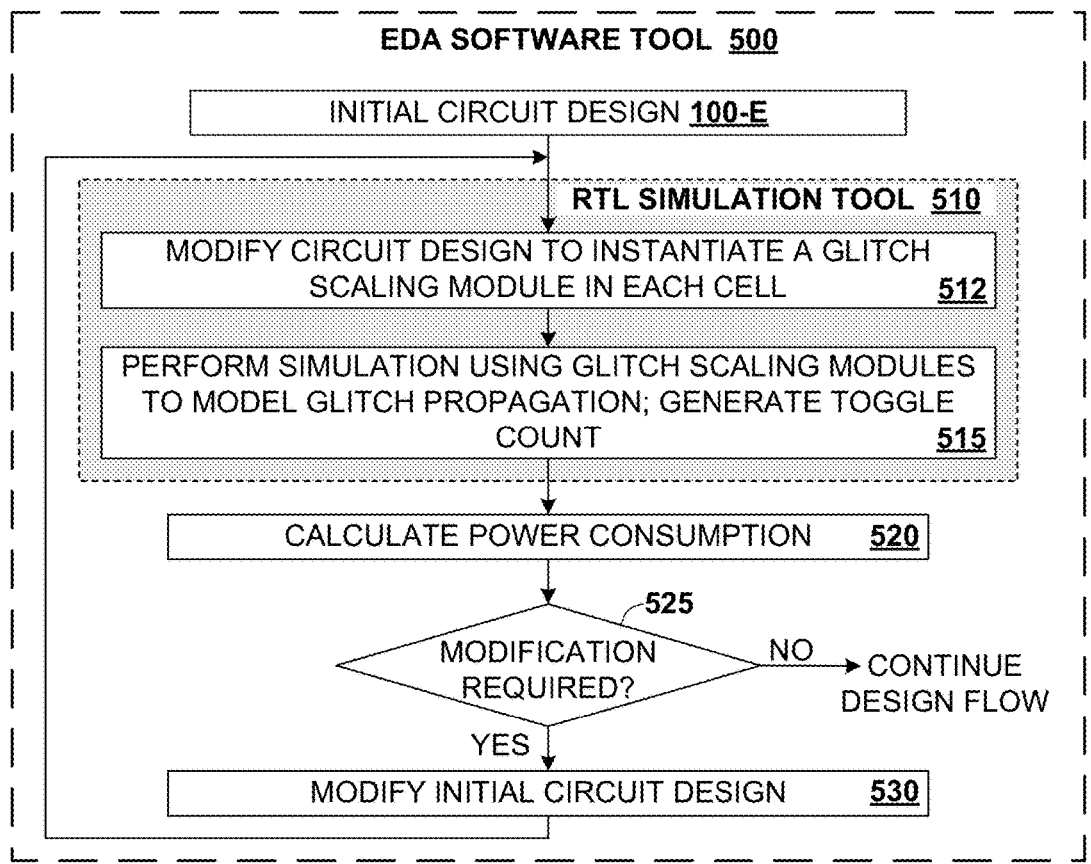
Figure 6A:
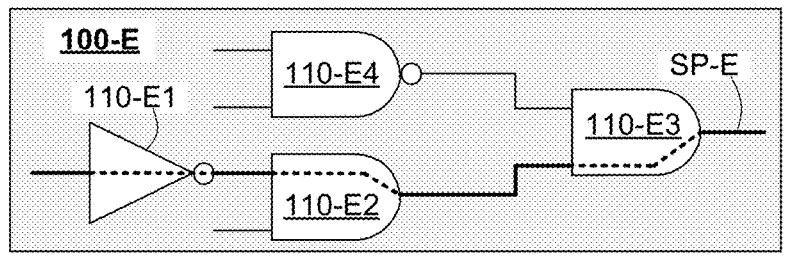
Figure 6B:
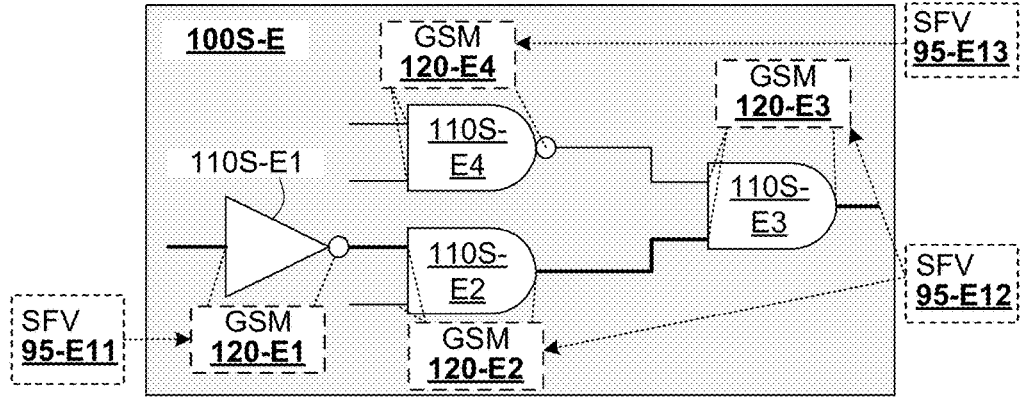
Figure 7A:
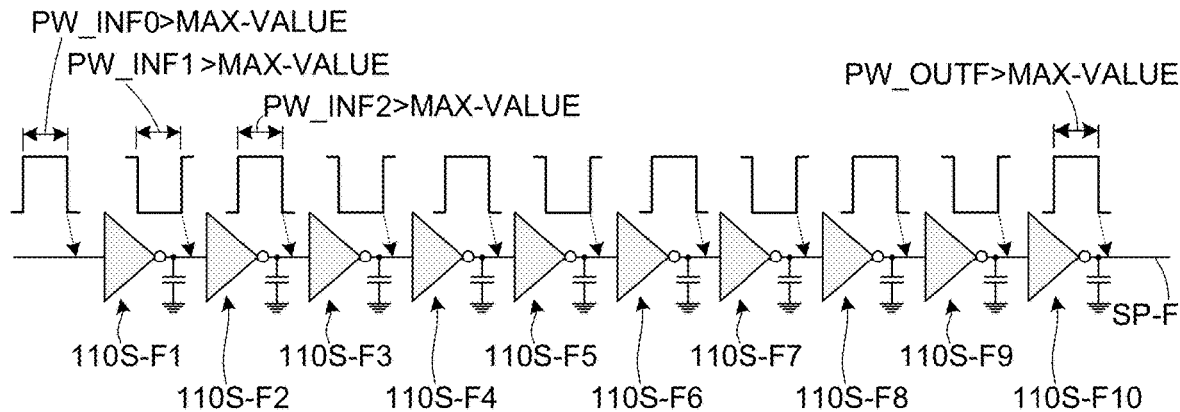
Figure 7B:
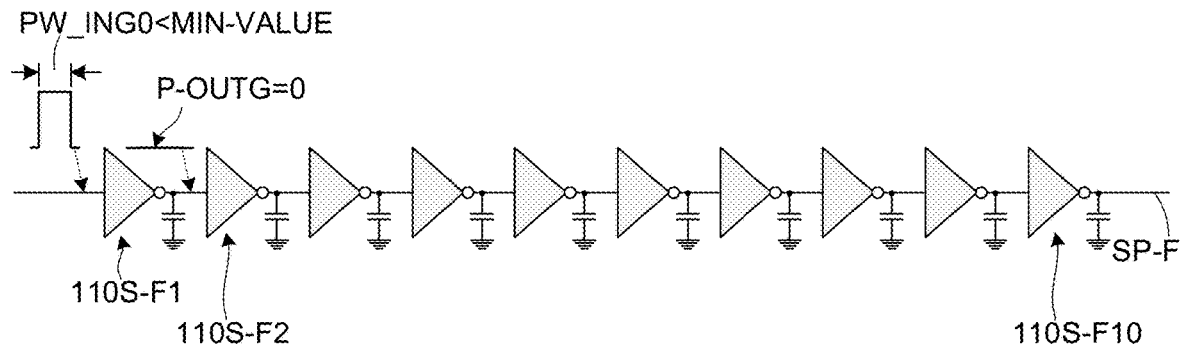
Figure 7C:
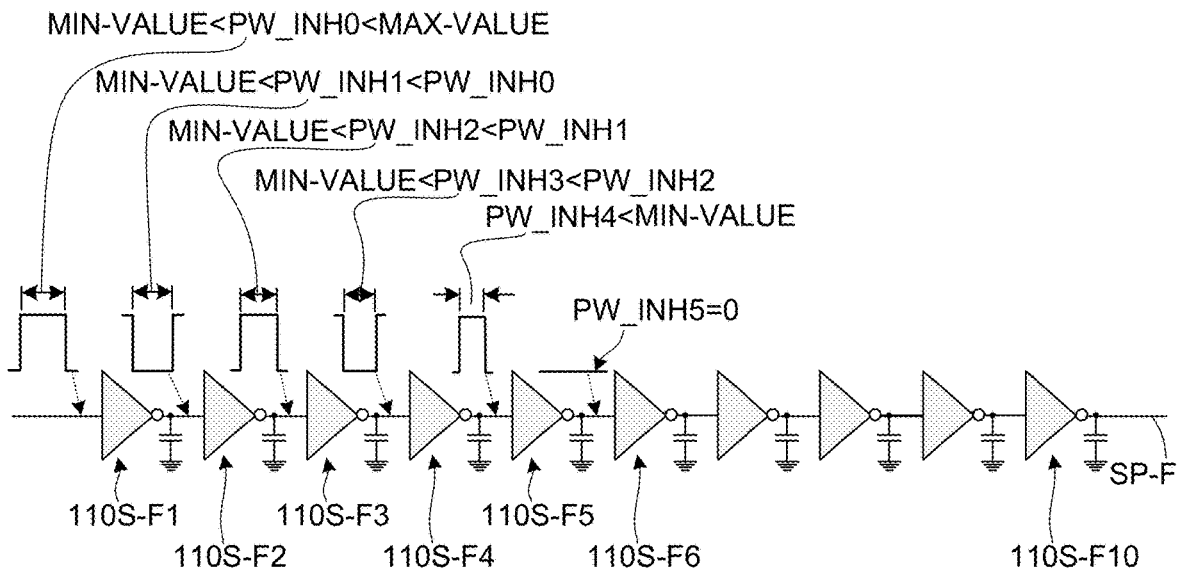
Figure 8:
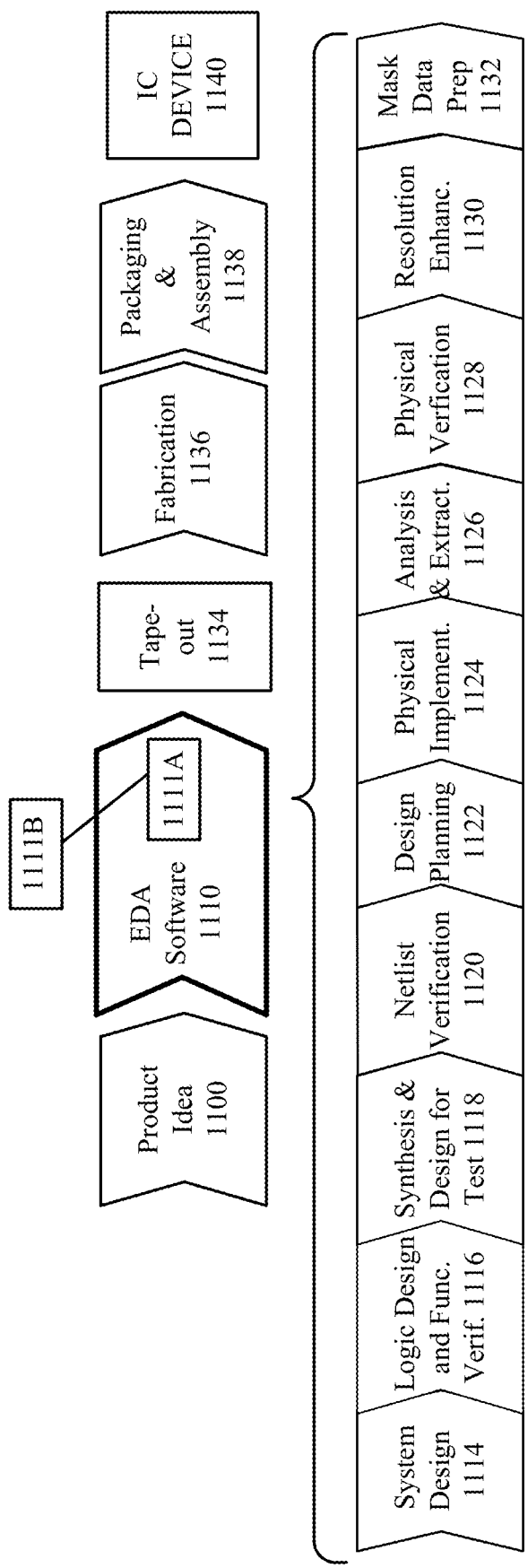
Figure 9B:
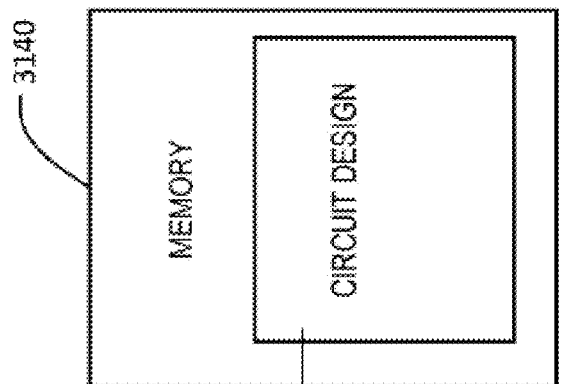
Figure 9C:
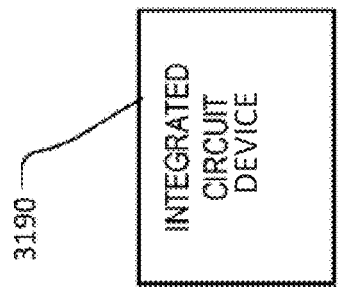
Figure 9A:
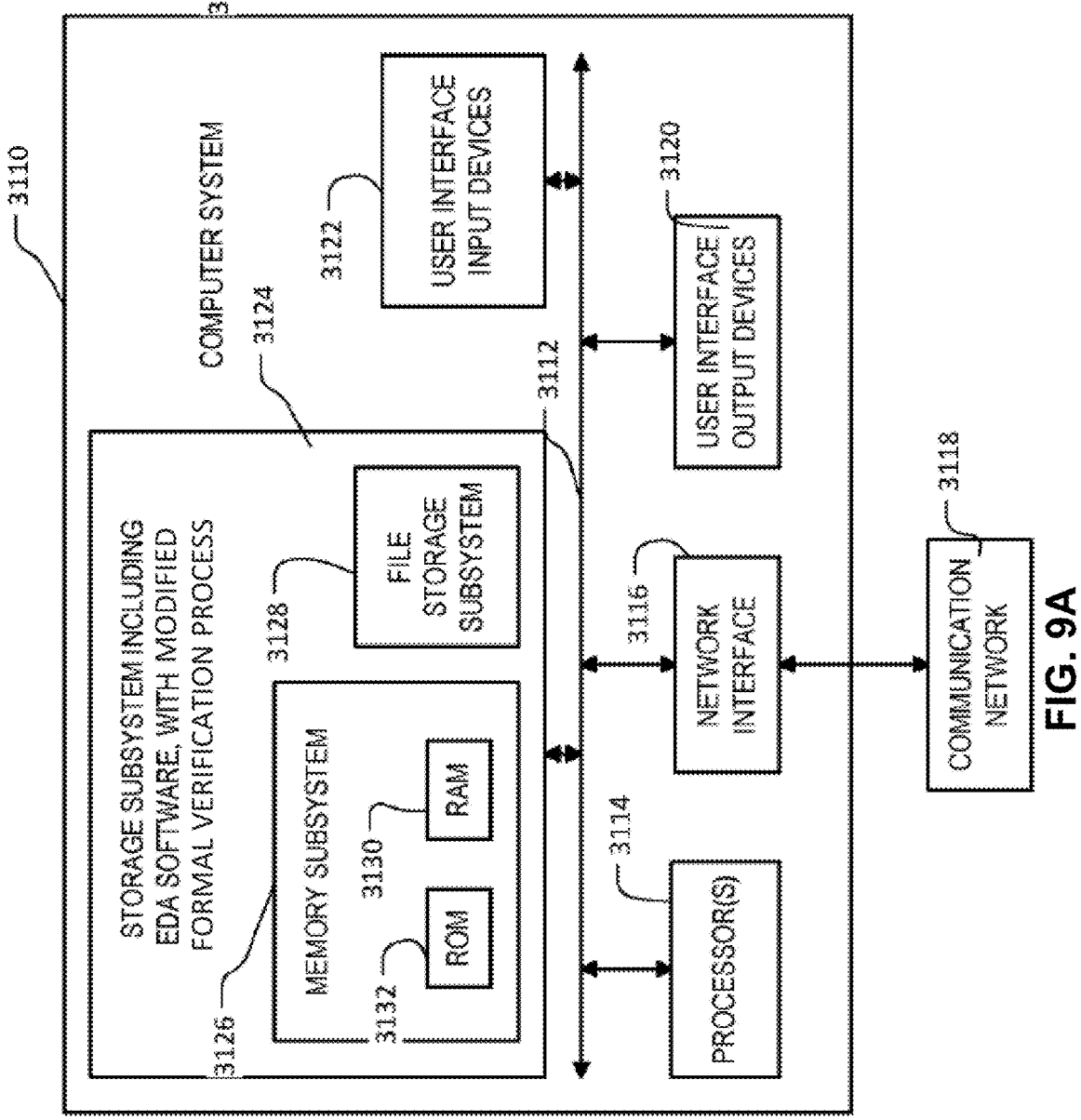

These and other features, aspects and advantages of the present invention will become better understood with reference to the following description, appended claims, and accompanying drawings, where:

FIG. 1 is simplified diagram depicting a computer system during simulation of a circuit design using a generalized glitch scaling process according to an embodiment of the present invention;

FIG. 2 is flow diagram depicting the generalized glitch scaling process utilized in the circuit design simulation of FIG. 1;

FIG. 3 flow diagram depicting a glitch scaling process according to another embodiment of the present invention;

FIGS. 4A, 4B and 4C are simplified timing diagrams depicting exemplary signal propagation and signal filtering operations performed in accordance with the glitch scaling process of FIG. 3;

FIG. 5 is a flow diagram showing generalized processes performed by an EDA software tool that implements the glitch scaling processes of the present invention according to another embodiment;

FIGS. 6A and 6B are simplified circuit diagrams respectively depicting an initial circuit design and a corresponding modified circuit design according to another exemplary embodiment;

FIGS. 7A, 7B and 7C are simplified circuit diagrams depicting glitch scaling processing of valid data signal pulses, non-scalable glitches and scalable glitches, respectively, transmitted along a signal path through a 10-stage inverter-buffer chain during simulation according to another exemplary embodiment;

FIG. 8 is a flowchart illustrating various operations in the design and fabrication of an integrated circuit in accordance with an embodiment of the present disclosure; and FIGS. 9A, 9B and 9C are simplified block diagrams of a computer system suitable for use with embodiments of the present invention, as well as circuit design and circuit embodiments of the technology associated with the present invention.

DETAILED DESCRIPTION OF THE DRAWINGS

The present invention relates to an improved EDA software tool and associated methods for use during the development of IC (circuit) designs that are subsequently utilized in the fabrication of physical IC devices (chips) based on the circuit designs. The figures and the following detailed description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The figures and detailed description may also signify, implicitly or explicitly, advantages and improvements of a subset of the exemplary embodiments described herein.

In the figures and detailed description, numerous specific details may be described to provide a thorough understanding of one or more of the exemplary embodiments. In the interest of not obscuring the presentation of embodiments of the claimed inventions, in the following detailed description, some processing steps or operations that are known in the art may have been combined together for presentation and for illustration purposes and in some instances may have not been described in detail. However, a person skilled in the art will recognize that these embodiments may be used in commerce without these specific details or with equivalents thereof. In other instances, well-known processes and devices are not described in detail as not to unnecessarily obscure aspects of these embodiments. In other instances, some processing steps or operations that are known in the art may not be described at all. The following description is instead focused on the distinctive features or elements of various embodiments of the claimed inventions. Furthermore, while this description may refer to some components of the structure in the singular tense, more than one component may be depicted throughout the figures and like components are labeled with like numerals.

The present invention is described herein with reference to a glitch decaying effect, which refers to an observed decreasing (scaling) of the pulse width (duration) of certain glitches as these glitches propagate from cell to cell along an associated signal path in a physical ("real world") IC device. It has also been observed that glitches having pulse widths below a certain minimum duration are entirely filtered. As such, the glitch decaying effect can cause certain glitches to propagate partially along a given signal path (e.g., as generally depicted in FIG. 7C, which is described with reference to a glitch scaling process utilized to replicate the glitch decaying effect during simulation). The following description therefore refers to three signal pulse types: valid data signal pulses that are entirely propagated, scalable glitches that are subject to the glitch decaying effect and therefore scaled in accordance with the glitch scaling process introduced herein, and non-scalable glitches that are entirely filtered. The present invention introduces a modified simulation method that models the propagation of scalable glitches by way of utilizing the glitch scaling process to predict the scaling and eventual filtering of glitches (e.g., in a manner similar to that shown in FIG. 7C).

FIGS. 1 and 2 provide a simplified circuit diagram and flow diagram, where FIG. 1 depicts a computer system 90 during performance of a computer-implemented simulation method that models the propagation of glitches and other pulse signals along a signal path SP of a simulated circuit design 100S, and FIG. 2 depicts a generalized glitch scaling process 200 utilized to accurately model the glitch decaying effect that occurs when a scalable glitch G-IN passes through a cell 100S during the simulation of circuit design 100S.

FIG. 1 utilizes several simplifications and graphical analogies to facilitate describing key aspects of the present invention with clarity and brevity. For example, to establish that the simulation method is implemented in computer system 90, FIG. 1 depicts the Verilog-based data associated with simulated circuit design 100S as being located in a simulation memory section 93 of computer system 90 in order to depict the addition of a glitch scaling module to each simulated cell (e.g., buffer-type cell 100S), and to depict the utilization of scaling factor and other values during simulation of the glitch scaling modules as being stored in a data memory section 95 of computer system 90; in practical implementations of the simulation method, these corresponding data types may not be stored in specified computer memory sections. In addition, FIG. 1 depicts a single simulated cell 110S and corresponding sections SP1 and SP2 of signal path SP, which form only a small portion of a typical simulated circuit design 100S; in practical implementations, operations similar to those described below with reference to simulated cell 110S are performed substantially simultaneously in other simulated cells (not shown) of simulated circuit design 100S. Moreover, simulated cell 110S is implemented as a buffer-type circuit configured to generate output signal pulses that mirror received signal pulses during normal operation; as explained below, the methodology described with reference to FIG. 1 applies to other cell types as well. Further, FIG. 1 utilizes two superimposed voltage/time graphs to respectively depict the transmission of an exemplary input glitch G-IN on signal path section SP1 to simulated cell 110S, and the subsequent transmission of a resulting output glitch G-OUT onto signal path section SP2 in accordance with the method described below. As explained in additional detail below, input glitch G-IN represents a scalable glitch, which is a signal pulse having a pulse width PW_IN that falls within a specified glitch duration range. As such, output glitch G-OUT is generated as a scaled (shorter duration) version of input glitch G-IN using the methodology described below, whereas signal pulses having pulse widths falling outside of the specified glitch duration range are processed in a different manner that is described below. In summary, FIG. 1 is simplified and modified to depict novel aspects of the present invention with reference to the scaled propagation of a single scalable glitch G-IN by a single cell 110S during a brief portion (time period) of the simulation of circuit design 100S.

Simulated cell 110S includes a logic function 112S configured using known techniques to generate output signal pulses in response to corresponding input signal pulses received on an input node N1 from first signal path section SP1, whereby the output signal pulses are passed to output node N2 by way of a delay element 112. The operation of simulated cell 110S models the operation of corresponding physical cells by way of utilizing logic function 112 to model electrical circuit operations of the corresponding physical cells, and by way of utilizing delay element 115 to model a measured delay period associated with the corresponding physical cells. Logic function 112 includes an associated Boolean logic operation and generates logic output signals in response applied input signals received on input node N1 and according to the associated Boolean logic operation. As mentioned above, simulated cell 110S is implemented in the depicted embodiment as a buffer-type logic cell, whereby logic function 112 generates output pulse edges that mirror corresponding input pulse edges (i.e., leading edges E1 and E3 of both input signal pulse G-IN and output signal pulse G-OUT are rising (positive-going or increasing) signal edges, and lagging edges E2 and E4 of both input signal pulse G-IN and output signal pulse G-OUT are falling (negative-going or decreasing) signal edges). Delay element 115 is implemented and functions in accordance with known techniques to delay the transmission of output signals from logic function 112 to output node N2 by a predetermined delay period for simulated cell 115 to accurately model the operation of a corresponding physical cell fabricated using a selected fabrication process (node). For example, as indicated in the upper left portion of simulation memory 93, when a rising (positive-going) leading edge E1 of input glitch G-IN arrives at input node N1 at time T, a corresponding output signal generated by buffer-type logic function 112 is delayed by delay element 115 for a predetermined time period D such that, as indicated in the upper right portion of simulation memory 93, the corresponding rising leading edge E3 of output glitch G-OUT is transmitted from output node N2 onto (second) signal path section SP2 at time T+D. Similarly, because falling (negative-going) trailing edge E2 of input glitch G-IN arrives at input node N1 at time T+PW_IN, the corresponding trailing edge E4 of output glitch G-OUT is transmitted from output node N2 onto (second) signal path section SP2 at time T+PW_IN+D. In contrast to the buffer-type example utilized in FIG. 1, if cell 110S was implemented as an inverter that receives input signal pulse G-IN, then the signal edges of the output signal pulse generated by the inverter would be opposite to the corresponding input pulse signal edges, but the output signal would be delayed and the glitch scaling process would otherwise be implemented as described below.

Generalized glitch scaling process 200 (FIG. 2) is utilized to model the propagation of a scalable glitch through each cell of circuit design 100S during simulation. The glitch scaling process is described below with reference to cell 110S of FIG. 1, but it understood that the operation is not intended to be limited to the exemplary configuration depicted in FIG. 1. Generalized glitch scaling process 200 includes determining the input duration (pulse width PW_IN) of input signal pulse G-IN received at input node N1 of cell 110S during simulation of circuit design 100S (block 210), utilizing the determined input duration PW_IN to identify when input signal pulse G-IN is a glitch (block 220; i.e., distinguishing input pulses that are glitches from input pulses that are valid data signal pulses), assigning a scaling factor value 95-1 to each identified glitch G-IN (block 230), optionally calculating a scheduled output duration % PW using the assigned scaling factor value 95-1 and the input pulse duration PW_IN (block 240), and then controlling output node N2 of cell 110S such that an output duration PW_OUT of each output pulse signal G-OUT generated in response to a corresponding glitch G-IN is determined by input duration PW_IN and assigned scaling factor value 95-1 (block 250; e.g., output node N2 is controlled by the calculated scheduled output duration % PW).

In preferred embodiments, calculating the scheduled output duration % PW for output glitch signal G-OUT involves multiplying the calculated input duration PW_IN with a stored scaling factor value (e.g., read from memory location 95-1 of data memory 95), where the scaling factor value is generated in accordance with previously observed glitch decay characteristics for cells of the same type as cell 110S. That is, prior to simulation of circuit design 100S, a scaling factor value is generated from measured glitch decay characteristics of previously fabricated buffer-type cells of the same configuration and size as cell 110S, and the thus-generated scaling factor value is then stored in memory location 95-3 in computer system 90 such that it is available for use in calculating scheduled output durations for scalable glitches received by simulated cell 100S. Simulated cell 110S is then controlled such that desired scaled glitch signal G-OUT, which is generated in response to input glitch signal G-IN, has an output duration PW_OUT that is limited to scheduled output duration % PW. In the example depicted in FIG. 1, scaled output glitch signal G-OUT represents an output signal pulse that is generated by logic function 112 in response to input glitch signal G-IN, then delayed by delay element 115 such that leading/rising edge E3 is generated at time T+D, but output node N2 of cell 110S is controlled such that trailing/falling edge E4 of scaled output glitch signal G-OUT occurs at time T+% PW+D (i.e., the portion of the output signal pulse generated by logic function 112 occurring after time T+% PW+D is truncated/suppressed). As set forth in additional detail below, by way of combining the glitch input duration determination (block 210), the scheduled output duration calculation (block 220) and the cell control operation (230), glitch scaling process 200 facilitates design-aware simulation methodologies that generate toggle counts (i.e., the total count of propagated glitches and valid data signal pulses occurring during a given simulated operation of circuit design 100S) with substantially higher accuracy than is possible using conventional glitch modeling methods.

Referring again to FIG. 1, in a presently preferred embodiment, circuit design 100S is modified to include a glitch scaling module 120 that is operably coupled in parallel with logic function 112 between input node N1 and output node N2 of simulated cell 110S, where glitch scaling module 120 is configured to perform glitch scaling process 200 (FIG. 2) for each signal pulse received by cell 110S during simulation of circuit design 100S. In one embodiment, glitch scaling module 120 is described using Verilog and incorporated/instantiated inside cell 110S a system Verilog bind statement, thereby obviating the modification of associated source files that include initial (unmodified) description of circuit design 100S. In an exemplary embodiment, glitch scaling module 120 includes a glitch detector 122 operably coupled to monitor input node N1 and to determine input pulse duration PW_IN of each input pulse signal/glitch G-IN, an output duration calculator 124 configured to generate a scheduled output duration % PW by multiplying the determined input duration PW_IN of each scalable glitch G-IN with stored cell-type-specific scaling factor value 95-1, and a cell output controller 126 that controls cell 110S (e.g., using a delay value D of cell 110S, as explained below) such that each scaled output glitch signal G-OUT has an associated output duration PW_OUT that is less than input pulse duration PW_IN. Glitch detector 122, output duration calculator 124 and cell output controller 126 are operably connected in series between input node N1 and output node N2, whereby glitch scaling module 120 is configured to operate in parallel with logic function 112 and delay element 115 in order to preserve normal output generation and output signal timing of cell 110S during simulation. That is, glitch scaling module 120 determines input duration PW_IN and calculates scheduled output duration % PW for input glitch G-IN while (i.e., substantially simultaneously in terms of the simulated operation of circuit design 100S) logic function 112 performs an associated logic operation in response to input glitch G-IN and passes the resulting output signal pulse (if any) to delay element 115. By operating in parallel with associated cell 110S, glitch scaling module 120 is able to accurately schedule a scaling event (i.e., truncation/suppression of the output signal passed to the output node N2 by the delay element 115) that is specific to the operational and timing characteristics of associated cell 110S before the output pulse generated by logic function 112 passes through delay element 115 and reaches output node N2. That is, by utilizing delay period D to predict the expected (first) edge E3 of output glitch signal G-OUT, which is generated by logic function 112 in response to a received glitch G-IN, glitch scaling module 120 facilitates generation of output glitch signal G-OUT on a schedule determined by the predefined characteristics of associated cell 110S (i.e., such that rising edge E3 is determined solely by logic function 112 and delay element 115), and also facilitates controlling the output node N2 such that output duration PW_OUT of output glitch signal G-OUT is limited to the scheduled output duration % PW (i.e., such that glitch scaling module 120 "forces" falling edge E4 of output glitch signal G-OUT at time T+D+% PW, as indicated in the upper right portion of simulation memory 93).

As mentioned above, FIGS. 1 and 2 depict a generalized glitch scaling process that is performed when a scalable input glitch signal G-IN is received by a given simulated cell 110S. During actual simulation of circuit design 100S, cell 110S receives sequential input signal pulses having associated input durations. For example, referring to the upper left portion of simulation memory 93 in FIG. 1, input pulse/glitch signal G-IN has an input duration PW_IN determined by the time period between arrival time T of rising (first) edge E1 and the arrival time T+PW_IN of falling (second) edge E2 at input node N1. Based on its corresponding input duration, each sequential input signal pulse can be categorized into one of three signal pulse types: scalable input glitch signals (e.g., glitch signal G-IN), valid data signal pulses, and non-scalable glitches. That is, the input pulse durations of valid data signal pulses are typically much longer than the input pulse durations of scalable and non-scalable glitches, and the input durations of non-scalable glitches are typically shorter than the input pulse durations of both scalable glitches and valid data signal pulses. Accordingly, in practical embodiments of the present invention, two signal threshold values (i.e., a low threshold value MIN-VALUE and a high threshold value MAX-VALUE) are utilized to distinguish scalable glitches from valid data signals and non-scalable glitches, whereby pulse widths below the low threshold value (minimum scalable glitch value) MIN-VALUE are designated as non-scalable glitches and filtered in the manner set forth below, and pulse widths greater than high threshold value (maximum scalable glitch value) MAX-VALUE are designated as valid data signals and propagated without filtering or scaling. In one embodiment, glitch duration values MAX-VALUE and MIN-VALUE are entered by a user (circuit designer), and are based, for example, on observed glitch propagation characteristics of physical IC devices. In one embodiment, low threshold values MIN-VALUE and high threshold values MAX-VALUE are cell-specific, meaning that the low threshold value MIN-VALUE assigned to one cell or type of cell (e.g., an inverters) might be higher or lower than the low threshold value MIN-VALUE assigned to a second cell or second cell type (e.g., OR gates). That is, a signal pulse having a given duration (e.g., 10 ns) may be characterized as a scalable glitch by a cell having a low threshold value MIN-VALUE of 8 ns and a high threshold value MAX-VALUE of 20 ns, but characterized as a non-scalable glitch by another cell having a low threshold value MIN-VALUE of 11 ns and a high threshold value MAX-VALUE of 25 ns. For clarity and simplicity, all low threshold values MIN-VALUE and high threshold values MAX-VALUE for the cells referenced in the examples below are treated to being the same (i.e., all the low threshold values MIN-VALUE of all cells are equal, and the high threshold values MAX-VALUE of all cells are equal).

The generalized glitch scaling process described above with reference to FIGS. 1 and 2 also references a single scaling factor value (i.e., the value stored in memory location 95-1) to generate scheduled output duration % PW as a fraction of input duration PW_IN. To accommodate the other signal pulse types, in practical embodiments the glitch scaling process utilizes three different scaling factors: a scaling factor value having an integer one value is utilized for valid data (propagated) signal pulses, a scaling factor value having an integer zero value is utilized for non-scalable (filtered) glitch signals, and a scaling factor value between zero and one is utilized for scalable glitch signals, where the value between zero and one is cell-type-specific and determined by the factors mentioned above. Depending on the pulse duration (pulse type) determined by glitch detector 122, an associated one of these scaling factors is provided to output duration calculator 124, which in turn utilizes the provided scaling factor value to produce a desired propagation result. For example, when a valid data signal pulse is detected by glitch detector 122, the associated "1" (integer one) scaling factor value is passed to cell output controller 126, whereby the output duration of the output pulse generated in accordance with the applied valid data signal (input) pulse is equal to the input duration of the applied valid data signal pulse (i.e., the valid data signal pulse is propagated in a non-scaled form). Alternatively, when a non-scalable glitch is detected by glitch detector 122, the associated "0" (integer zero) scaling factor value is passed to cell output controller 126, whereby the output pulse generated in accordance with the applied non-scalable glitch is entirely suppressed. Of course, scalable glitches are processed using the between-zero-and-one scaling factor value (e.g., 0.6) in the manner described above with reference to FIGS. 1 and 2. Exemplary (e.g., user-defined) scaling factor values for the three input pulse types (conditions) applied to an exemplary single input buffer-type (BUFF1) cell are provided below in Table 1, where valid data signal pulses (i.e., PW_IN>=MAX-VALUE), scalable glitch signals (different signal pulse types (conditions). In other embodiments, the numbers of threshold values and scaling factor values utilized by each glitch scaling module may be increased as needed to reflect additional observed glitch propagation characteristics.

TABLE 1

Exemplary Scaling Factor Values

| Logic Type | Input Pulse Condition | Scaling Factor Value |
|---|---|---|
| BUFF1 | PW_IN >= MAX-VALUE | 1 (propagated) |
|  | MIN-VALUE <= PW_IN < MAX-VALUE | 0.6 (scaled) |
|  | PW_IN < MIN-VALUE | 0 (filtered) |

FIG. 3 is a flow diagram depicting the glitch propagation modeling method of FIG. 2 in additional detail according to a presently preferred embodiment. The various processes and features mentioned below with reference to FIG. 3 are described with reference to FIG. 1.

Blocks 310 to 330 (FIG. 3) include an exemplary process for determining the input duration of a received glitch (or other input signal pulse), which in one embodiment is performed by glitch detector 122 of glitch scaling module 120 (FIG. 1). Block 310 of the exemplary process includes detecting a start (first) arrival time T of the rising (first) edge E1 at input node N1 of input glitch signal G-IN and storing (recording) the corresponding first start arrival time T in an associated memory location. Block 320 includes detecting the subsequent end (second) arrival time of falling (second) edge E2 of input glitch signal G-IN at input node N1 and recording the second arrival time. For explanatory purposes, the end (second) arrival time is referenced using "T+PW_IN", which indicates the arrival time of edge E2 occurs after start time T equal to the pulse width PW_IN of input glitch signal G-IN. Block 330 of the exemplary process includes generating the input duration PW_IN by calculating a difference between the start and end arrival times, i.e., by subtracting the recorded start time T from the recorded end time T+PW_IN.

As mentioned above, glitch detector 122 is also configured to utilize the input duration of each received input pulse to distinguish scalable glitches from other signal pulse types (e.g., valid data signals and non-scalable/filterable glitches) by comparing each calculated input pulse duration (e.g., duration PW_IN of input glitch signal G-IN) with at least one stored glitch duration value. Referring again to FIG. 3, in the preferred embodiment scalable glitches are distinguished from valid data signals by comparing input duration PW_IN with stored maximum glitch duration value MAX-VALUE (block 340), and scalable glitches are distinguished from non-scalable glitches by comparing input duration PW_IN with stored minimum glitch duration value MIN-VALUE (block 350). Referring to FIG. 1, these decision operations are depicted by way of the dotted-line-arrow extending from memory locations 95-2 and 95-3 to glitch detector 122, indicating that glitch detector 122 utilizes a maximum glitch value MAX-VALUE stored in memory location 95-2 and minimum glitch value MIN-VALUE stored in memory location 95-3 to perform the operations depicted in decision blocks 340 and 350 of FIG. 3. That is, when an input duration falls within the range defined by stored values MAX-VALUE and MIN-VALUE, then the associated signal pulse is identified as a scalable glitch, and the glitch scaling process described above is performed. In contrast, when an input duration determined by glitch detector 122 is greater than value MAX-VALUE (YES branch from block 340 in FIG. 3), the signal is determined to be a valid data signal pulse, and the output signal generated by the associated cell is not affected by the glitch scaling module (that is, controlling the cell in accordance with block 230 of FIG. 2 can only be performed when the detected input duration is less than stored maximum glitch duration value MAX-VALUE). Alternatively, when an input duration determined by glitch detector 122 is less than value MIN-VALUE (YES branch from block 350 in FIG. 3), the signal is determined to be a valid data signal pulse, and the glitch scaling module functions to filter out the non-scalable glitch by controlling the cell such that any output signal generated by the logic function in response to the detected non-scalable glitch is entirely suppressed (block 355). That is, controlling the cell in accordance with block 230 of FIG. 2 is only performed when the detected input duration is less than stored maximum glitch duration value MAX-VALUE, and is greater than stored minimum value MIN-VALUE.

FIGS. 4A to 4C are simplified timing diagrams depicting exemplary signal propagation and signal filtering operations performed in accordance with decision blocks 340 and 350 of FIG. 3. FIGS. 4A and 4B include examples that are described with reference to the circuit structures depicted in FIG. 1, but FIG. 4A depicts a suppressed glitch scaling process perform in response to a valid data signal pulse, and FIG. 4B depicts a filtered non-scalable glitch. That is, the input signal pulses P-INA and P-INB depicted in FIGS. 4A and 4B are applied to input node N1 instead of scalable input glitch signal G-IN shown in FIG. 1, and that the output signals P-OUTA and P-OUTB depicted in FIGS. 4A and 4B are transmitted from output node N2 onto signal path segment SP2 instead of scaled output glitch signal G-OUT.

FIG. 4A depicts a first example in which a valid data signal pulse P-INA (i.e., an input signal pulse having an input duration PW_INA that is greater than maximum glitch duration value MAX-VALUE) is applied to input node N1. As discussed above, input duration PW_INA is determined by way of calculating a difference between rising edge E1A and falling edge E2A, which arrive at input node N1 at start time T and end time T+PW_INA, respectively. Delay period D, which is established by delay element 115 as described above, is indicated in the bottom left portion of FIG. 4A, and for descriptive purposes delay period D is depicted as being longer than input duration PW_INA. Using the buffer-type cell description established above, logic function 112 produces output signal pulse P-OUTA having an output duration PW_OUTA that is equal to input pulse duration PW_INA, and delay element 115 delays the transmission of output pulse signal P-OUTA such that rising edge E3A of output signal pulse P-OUTA is generated at a time equal to delay period D after start time T (i.e., at time T+D), and falling edge E4A of output signal pulse P-OUTA is generated at a time equal to output duration PW_OUTA after the generation of rising edge E3A (i.e., at time T+D+ PW_OUTA). Because input duration PW_INA is greater than maximum glitch duration value MAX-VALUE, cell 110S is not controlled in accordance with block 230 of FIG. 2, and the output signal pulse generated by logic function 112 is generated at output node N2 (after delay period D) without any modification by glitch scaling module 120. Comparing P-OUTA to maximum glitch duration value MAX-VALUE overcomes the limitation of some simulators that rely solely on rise time and fall time of input pulse edges to distinguish glitches from valid data signal values.

FIG. 4B depicts a second example in which a non-scalable glitch G-INB (i.e., an input signal pulse having input duration PW_INB that is less than minimum glitch duration value MIN-VALUE) is applied to input node N1. Using the buffer-type cell description established above, logic function 112 should produce an output signal pulse starting at time T+D and having an output duration that is equal to input pulse duration PW_INB. However, based on observations of physical IC devices, it is known that glitches having durations lower than minimum glitch duration value MIN-VALUE are not propagated by corresponding cells in physical IC devices. Therefore, to model this observed performance in simulated circuit 100S, cell 110S is controlled in accordance with block 355 (FIG. 3) such that any output signal pulse generated by logic function 112 and passed through delay element 115 is suppressed at output node N2 (i.e., all output signals are suppressed during an output suppression period between time T+D and a time equal to input pulse duration PW_INB after time T+D, i.e., time T+D+PW_INB). In one embodiment, to ensure that non-scalable glitches are reliably filtered, glitch control circuit 120 initiates the output suppression period (i.e., prevents any output pulse signals from being transmitted from output node N2 onto signal path section SP2) at a point prior to time T+D, and delays releasing output node (i.e., stops suppressing output signals) until a release time R that occurs simultaneously with or after any output signal pulse would be produced by cell 110S (i.e., at or soon after time T+D+PW_INB). Not all non-scalable glitches can be filtered (removed) entirely, an must be scaled. For example, when the duration of a non-scalable glitch exceeds a cell's delay period, the leading edge of the glitch may cause an output transition before glitch duration is determined. In this case, the output is suppressed immediately after the non-scalable glitch is identified, whereby the output pulse is maximally scaled (reduced).

FIG. 4C illustrates an example in which a scalable glitches G-INC (i.e., an input signal pulses having input duration PW_INC that is greater than minimum glitch duration value MIN-VALUE and less than the maximum glitch duration value MAX-VALUE) are applied to input node N1. Using the buffer-type cell description established above, logic function 112 should produce output signal pulses starting at time T+D and having output durations that are equal to input pulse durations PW_INC and PW_IND. However, based on observations of physical IC devices, it is known that glitches having durations between than minimum glitch duration value MIN-VALUE and maximum glitch duration MAX-VALUE are only partially propagated in corresponding cells in physical IC devices due to the glitch decaying effect. In one embodiment, cell output controller 126 of glitch scaling module 120 functions to suppress scaled output glitch signal G-OUTC at a time T+D+% PW determined by a sum of start time T, scheduled output duration % PW and cell-type-specific delay period D provided by delay element 115. With this configuration, as indicated in FIG. 4C, when leading (first) edge E3C of scaled output glitch signal G-OUTC is generated at the expected time (i.e., at a time determined by a sum of arrival time T of leading edge E1C of scalable glitch signal G-INC plus cell-specific delay period D), output duration PW-OUTC is equal to scheduled output duration % PW.

FIG. 5 is a flow diagram showing generalized processes performed by an EDA software tool 500 that is configured to utilize the glitch scaling process of the present invention to perform power consumption analysis during development of a circuit design 100-E according to another practical embodiment of the present invention. As indicated at the top of FIG. 5, an initial circuit design 100-E is submitted in an appropriate RTL format (e.g., Verilog) to an RTL simulation tool 510, which is configured to implement the glitch propagation method described above by way of automatically assigning/attaching a glitch scaling module to each cell of circuit design 100-E in the manner described above before performing a simulation process operation, for example, using system Verilog bind statements to avoid modification of the circuit design source files. That is, as indicated in block 512 and indicated in FIGS. 6A and 6B, simulation tool 510 modifies circuit design 100-E to include glitch scaling modules 120-E1 to 120-E4 connected between the input and output nodes of corresponding cells 110-E1 to 110E-4, respectively (i.e., such that each glitch scaling module 120-E1 to 120-E4 is connected in parallel with the associated logic function (not shown) of corresponding cells 110-E1 to 110E-4, respectively, as shown and described above with reference to FIG. 1). After modifying circuit design 100-E in this manner, simulation of modified circuit design 100S-E is performed such that input signal pulses are transmitted along the various signal paths (e.g., signal path SP-E, shown in FIG. 6A) of modified circuit design 100S-E, where glitch scaling modules 120-E1 to 120-E4 are utilized to perform the glitch scaling process described above with respect to input signal pulses received by corresponding cells 110-E1 to 110E-4, respectively (block 515). In the power consumption analysis example, the simulation operation also includes generating a toggle count including a total number of output signal pulses (both propagated/scaled glitch signals and propagated valid data signals) that are output from cells 110-E1 to 110E-4 onto the signal paths of circuit design 100S-E. After the simulation operation is completed, the toggle count is utilized to calculate power consumption by circuit design 100-E (block 520), and the calculated power consumption is utilized to determine whether circuit design 100-E complies with user-defined power constraints. If circuit design 100-E fails to satisfy the power constraints (NO branch from block 525), then modification of circuit design 100-E is performed (block 530), and then the modified circuit design is re-submitted to simulation tool 510 and the power consumption analysis process is repeated. If circuit design 100-E satisfies the power constraints, then no modification of circuit design 100-E is required for this purpose, and the design flow for circuit design 100-E proceeds to a next phase (YES branch from block 525). By utilizing the simulation operation described above, simulation tool 510 provides EDA software tool 500 with substantially higher glitch count accuracy, thereby improving the functioning of a computer implementing EDA software tool 500 by reducing the number of iterations (and associated processor operations) required to achieve compliance with established power constraints.

FIGS. 6A and 6B are simplified circuit diagrams showing a portion of initial circuit design 100-E (FIG. 6A), and the same portion of modified circuit design 110S-E (FIG. 6B) during the simulation operation described above with reference to FIG. 5. Referring to FIG. 6A, initial circuit design 100-E includes cells 100-E1 to 100-E4 and a signal path SP-E that passes through corresponding input and output nodes of cells 100-E1, 100-E2 and 100-E3. Note that cell 100-E1 is an inverter (first cell type), cells 100-E2 and 100-E3 are AND-type logic gates (second cell type), and cell 100-E4 is a NAND-type logic gate (third cell type). As described above, simulation tool 510 modifies initial circuit design 100-E prior to simulation such that, as shown in FIG. 6B, each modified cell 100S-E1 to 100S-E4 includes an associated assigned glitch scaling module 120-E1 to 120-E4, where each glitch scaling module 120-E1 to 120-E4 is configured as described above with reference to FIG. 1, and is connected between the input and output nodes of its associated modified cell 100S-E1 to 100S-E4 in the manner described above with reference to FIG. 1. As indicated in FIG. 6B, the assigned glitch scaling modules 120-E1 to 120-E4 assigned to different cell types are controlled by associated cell-type-specific scaling factor values 95-E11, 95-E12 and 95-E13, whereby modified inverter cell 100S-E1 is controlled by glitch scaling module 120-E1 to propagate corresponding (first) fractions of received scalable glitches in accordance with (first) inverter-specific scaling factor values 95-E11, modified AND-gate cells 110S-E2 and 100S-E3 are controlled by glitch scaling modules 120-E2 and 120-E3, respectively, to propagate corresponding (second) fractions of received scalable glitches in accordance with (second) inverter-specific scaling factor values 95-E12, and modified NAND-gate cell 110S-E4 is controlled by glitch scaling module 120-E4 to propagate corresponding (third) fractions of received scalable glitches in accordance with (third) inverter-specific scaling factor values 95-E13, where scaling factor values 95-E11, 95-E12 and 95-E13 are determined by observed glitch decaying effects produced by physical inverter, AND-gate and NAND-gate elements, respectively, that have been produced in previously fabricated IC devices. In one embodiment, scaling factor values 95-E11, 95-E12 and 95-E13 are different from each other, whereby glitch scaling modules 120-E1, 120-E2 and 120-E3 propagate different proportions (fractions) of corresponding scalable glitch signals by way of calculating different scheduled output durations using the different scaling factor values. For example, when scaling factor value 95-E11 equals 0.6 and scaling factor value 95-E13 equals 0.75, and assuming two scalable glitches having the same input duration (e.g., 10 ns) are received by modified cells 100S-E1 and 100S-E4, the scheduled output duration of 6 ns generated by glitch scaling module 120-E1 (i.e., by way of multiplying cell-type-specific scaling factor value 0.6 and the input duration 10 ns) would be different from the scheduled output duration of 7.5 ns generated by glitch scaling module 120-E4 (i.e., by way of multiplying cell-type-specific scaling factor value 0.75 and the input duration 10 ns).

FIGS. 7A to 7C depict glitch scaling processing of valid data signal pulses, non-scalable glitches and scalable glitches, respectively, that are transmitted along a signal path SP-F through a 10-stage inverter-buffer chain made up of modified cells 110S-F1 to 110S-F10 during simulation of an associated circuit design. As described above, each modified cell 110S-F1 to 110S-F10 includes an instantiated glitch scaling module (e.g., glitch scaling module 120 shown in FIG. 1) or is otherwise modified to perform the glitch scaling process described above. By employing the glitch scaling process, toggle count generated on signal line SP-F in response to each signal pulse type more accurately reflects corresponding toggle counts observed in IC devices than is possible using conventional glitch modeling approaches.

FIG. 7A depicts effectively disabling the suppressing/truncating portion of the glitch scaling process to propagate valid data signal pulses without modification along signal path SP-F. That is, FIG. 7A depicts a period during the simulation when a simulated input pulse signal having an initial signal pulse width PW_INF0 is passed on a corresponding section of signal path SP-F to the input node of modified cell 110S-F1, and then sequentially along signal path SP-F through modified cells 110S-F2 to 110S-F10. When the input signal pulse is received by modified cell 110S-F1, the glitch scaling module (not shown) instantiated in modified cell 110S-F1 identifies the input pulse signal as a valid data signal pulse by determining that initial signal pulse width PW_INF0 is greater than user-defined maximum glitch value MAX-VALUE, and therefore controls modified cell 110S-F1 to propagate the input signal pulse by way of generating a corresponding inverted output signal pulse having an output duration that is equal to initial signal pulse width PW_INF0. The resulting propagated inverted signal pulse, which is identified in FIG. 7A by way of signal pulse width PW_INF1, is passed along a corresponding section of signal path SP-F to subsequent modified cell 110S-F2. Next, the glitch scaling module (not shown) instantiated in modified cell 110S-F2 also identifies the input pulse signal as a valid data signal pulse, and therefore controls modified cell 110S-F2 to pass the inverted signal pulse to next sequential modified cell 110S-F3 in the form of a re-inverted signal pulse having a duration PW_INF2, which is equal to both signal pulse duration PW_INF1 and initial signal pulse width PW_INF0. Because the pulse width (duration) of the valid data signal pulse remains constant as it passes along signal path SP-F through modified cells 110S-F1 to 110S-F10, an output signal pulse width PW_OUTF of the final output pulse generated by modified cell 110S-F10 is substantially equal to pulse width PW_INF0 of the input pulse signal received by modified cell 110S-F1. Accordingly, a toggle count of ten is generated by the complete propagation of a valid data signal pulse through the 10-stage inverter-buffer chain, which corresponds to the corresponding toggle count expected in an IC device.

FIG. 7B depicts maximization of the suppressing/truncating operation performed by the glitch scaling modules to filter detected non-scalable glitch signals. That is, FIG. 7B depicts a period during the simulation when a simulated input pulse signal having an initial signal pulse width PW_ING0 is passed on a corresponding section of signal path SP-F to the input node of modified cell 110S-F1. When the input signal pulse is received by modified cell 110S-F1, the glitch scaling module (not shown) instantiated in modified cell 110S-F1 identifies the input pulse signal as a non-scalable glitch signal by determining that initial signal pulse width PW_ING0 is less than user-defined minimum glitch value MIN-VALUE, and therefore controls modified cell 110S-F1 to suppress any output signal pulse that may be generated in response to the non-scalable glitch signal, whereby an output signal P_OUTG generated at the output node of modified cell 110S-F1 is zero. As such, non-scalable glitch signals are filtered (removed) from signal path SP-F in a way that models the operation of physical IC devices. Accordingly, a toggle count of zero is generated by filtering non-scalable glitches submitted to 10-stage inverter-buffer chain, which corresponds to the glitch filtering effect experienced in physical IC devices.

FIG. 7C depicts progressive scaling (gradual reduction) of a scalable glitch signal as it passes along signal path SP-F, whereby the scalable glitch is gradually reduced until it becomes a non-scalable glitch and is thus filtered in a manner consistent with the glitch decaying effect observed in physical IC devices. That is, FIG. 7C depicts another period when a simulated input pulse signal having an initial signal pulse width PW_INH0 is passed on a corresponding section of signal path SP-F to the input node of modified cell 110S-F1. The glitch scaling module instantiated in modified cell 110S-F1 identifies the input pulse signal as a scalable glitch signal using the method described above (i.e., by determining initial pulse width/duration PW_INH0 is between MIN-VALUE and MAX-VALUE), and therefore calculates an output duration by multiplying glitch duration PW_INH0 by an associated inverter-type (cell-type-specific) scaling factor value. The resulting propagated signal pulse generated at the output node of modified cell 110S-F1 has a pulse width/duration PW_INH1 that is a corresponding fraction less than initial signal pulse width PW_INH0, but, as indicated in FIG. 7C, is still between MIN-VALUE and MAX-VALUE. Accordingly, the glitch scaling module instantiated in modified cell 110S-F2 calculates a second output duration by multiplying pulse width/duration PW_INH1 by the associated inverter-type (cell-type-specific) scaling factor value, whereby modified cell 110S-F2 is controlled to output a corresponding propagated pulse having width/duration PW_INH3 that is a corresponding fraction less than signal pulse width PW_INH1. A corresponding proportionally reduced scalable glitch signal having pulse width PW_INH2 is then generated by modified cell 110S-F3 and passed to modified cell 110S-F4. In the depicted example, the initial pulse width of the scalable glitch signal received by modified cell 100S-F1 has been progressively reduced by modified cells 100S-F2 and 100S-F3 such that the output pulse generated by modified cell 110S-F4 is less than MIN-VALUE, whereby modified cell 110S-F5 identifies the associated signal pulse as a non-scalable glitch, and filters the non-scalable glitch in the manner described above such that a zero-pulse output signal PW_INH5 is passed from modified cell 100S-F5 to modified cell 100S-F6.

The embodiments described above present a new glitch modeling approach that enables RTL simulation tools to mimic the glitch decaying effects observed in actual IC devices. In addition, these embodiments offer the flexibility for further fine-tuning to fit behaviors of real glitches and reusability for designs using the same library cells.

Technology Specific EDA System/Workflow Explanation

FIG. 9 illustrates various processes performed in the design and fabrication of IC devices using EDA software tools with a computer to transform data and instructions that represent the associated IC devices. These processes start with the generation of a product idea (1100) with information supplied by one or more circuit designers. The product idea is realized as the evolving circuit design during the circuit design process performed by the circuit designer(s) using EDA software tools (1110). One or more steps of the EDA software design process performed by EDA software tools (1110) is implemented using a computer-readable medium 1111A that is read by a computer 1111B. EDA software tools may also be signified herein using the singular "EDA software tool", as EDA software, or as a design tool. When a circuit design is finalized, it is typically taped-out (1134), and then multiple ICs, each being a physical implementation of the final circuit design, are fabricated on a semiconductor wafer (160) using a selected technology node. The semiconductor wafer is then diced into individual chips, with each chip including one of the ICs, and then the chips are packaged and assembled using corresponding processes (1138), resulting in finished IC device 1140.

Note that the design process that uses EDA software tools (1110) includes operations 1114-1132, which are described below. This design flow description is for illustration purposes only and is not meant to limit the present disclosure. For example, an actual circuit design may require a circuit designer to perform the design operations in a different sequence than the sequence described herein.

During system design (1114), a circuit designer describes the functionality to be performed by the manufactured IC device. The designer can also perform what-if planning to refine the functionality and to check costs. Note that hardware-software architecture partitioning can occur at this stage. Exemplary EDA software products from Synopsys, Inc. of Mountain View, Calif. that can be used at this stage include: Model Architect, Saber, System Studio, and Designware products. Cells or other descriptions including all relevant information pertaining to the two-part USB PHY configuration of the present invention are typically copied from a library accessible by way of the EDA software tool, and inserted into a circuit design during the system design process.

Then, during logic design and functional verification (1116), VHDL or Verilog code for modules in the circuit is written and the design is checked for functional accuracy. More specifically, the design is checked to ensure that it produces the correct outputs. The VHDL or Verilog code is software comprising optimized readable program instructions adapted for the efficient description of a logic design. Exemplary EDA software products from Synopsys, Inc. of Mountain View, Calif. that can be used at this stage include: VCS, Vera, Designware, Magellan, Formality, ESP and Leda products.

Next, during synthesis and design for test (1118), VHDL/Verilog code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

Moreover, during netlist verification (1120), the netlist is checked for compliance with timing constraints and for correspondence with the VHDL/Verilog code. Exemplary EDA software products from Synopsys, Inc. of Mountain View, Calif. that can be used at this stage include: Formality, Primetime, and VCS products. In one embodiment, the power simulation tool/method described herein may be utilized during netlist verification.

Furthermore, during design planning (1122), an overall floor plan for the integrated circuit is constructed and analyzed for timing and top-level routing. Exemplary EDA software products from Synopsys, Inc. of Mountain View, Calif. that can be used at this stage include: Astro and IC Compiler products.

Additionally, during physical implementation (1124), the placement (positioning of circuit elements such as transistors or capacitors) and routing (connection of the same by a plurality of conductors) occurs. Exemplary EDA software products from Synopsys, Inc. of Mountain View, Calif. that can be used at this stage include: the Astro and IC Compiler products.

Then, during analysis and extraction (1126), the circuit function is verified at a transistor level, which permits refinement of the logic design. Exemplary EDA software products from Synopsys, Inc. of Mountain View, Calif. that can be used at this stage include: Astrorail, Primerail, Primetime, and Star RC/XT products.

Next, during physical verification (1128), the design is checked to ensure correctness for manufacturing issues, electrical issues, lithographic issues, and circuitry. Exemplary EDA software products from Synopsys, Inc. of Mountain View, Calif. that can be used at this stage include the Hercules product.

Moreover, during resolution enhancement (1130), geometric manipulations of the layout are performed to improve manufacturability of the design. Exemplary EDA software products from Synopsys, Inc. of Mountain View, Calif. that can be used at this stage include: *Proteus, Proteus*, and PSMGED products.

Additionally, during mask-data preparation (1132), the 'tape-out' data for production of masks to produce finished integrated circuits is provided. Exemplary EDA software products from Synopsys, Inc. of Mountain View, Calif. that can be used at this stage include the Cats. family of products.

For all of the above mentioned integrated circuit design tools, similar tools from other EDA vendors, such as Cadence and Mentor Graphics can be used as an alternative. Additionally, similarly non-commercial tools available from universities can be used.

Embodiments of the present disclosure can be used during one or more of the above-described stages. Specifically, some embodiments of the present disclosure can be used in EDA software 1110.

A storage subsystem is preferably used to store the basic programming and data constructs that provide the functionality of some or all of the EDA tools described herein, and tools applied for development of cells for the library and for physical and logical design using the library. These software modules are generally executed by one or more processors in a manner known to those of ordinary skill in the art.

Hardware/Software Equivalence

Certain innovations, embodiments and/or examples described herein comprise and/or use a processor. As used herein, the term "processor" signifies a tangible information processing device that physically transforms information, for example, data. As defined herein, "data" signifies information that can be in the form of an electrical, magnetic, or optical signal that is capable of being stored, accessed, transferred, combined, compared, or otherwise manipulated by an information processing device.

The processor can be electronic, for example, comprising digital logic circuitry (for example, binary logic), or analog (for example, an operational amplifier). The processor can also be non-electronic, for example, as seen in processors based on optical signal processing, DNA transformations or quantum mechanics, or a combination of technologies, such as an optoelectronic processor. For information structured in binary form, any processor that can transform the information using the AND, OR and NOT logical operations (and their derivatives, such as the NAND, NOR, and XOR operations) can transform the information using any function of Boolean logic. A processor such as a neural network processor can also transform information non-digitally. There is no scientific evidence that any of these processors are processing, storing and retrieving information, in any manner or form equivalent to the bioelectric circuitry of the human brain.

As used herein, the term "module" signifies a tangible information processing device that typically is limited in size and/or complexity. For example, one or more methods or procedures in a computer program can be referred to as a module. A module can also refer to a small network of digital logic devices, in which the logic devices often may be interconnected to form a network. In many cases, methods and procedures in a computer program written in a specialized language, such as System C, can be used to generate a network of digital logic devices that process information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (Rams), all of which are typically configured during manufacturing. Temporarily configured modules can be manufactured, for example, using Field Programmable Gate Arrays (FPGAs—for example, sold by Xilink or Altera), Random Access Memories (RAMs) or microprocessors. A module is configured to process information, typically using a sequence of operations to transform the information (or in the case of ROMs and RAMS, transforming information by using the input information as an address for memory that stores output information), to perform aspects of the present innovations, embodiments and/or examples of the invention.

Modules that are temporarily configured need not be configured at any one instance in time. For example, an information processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term "algorithm" signifies a sequence or set of operations or instructions that a module can use to transform information to achieve a result. A module can comprise one or more algorithms. As used herein, the term "computer" includes an information processor that can perform certain operations such as (but not limited to) the AND, OR and NOT logical operations, with the addition of memory (for example, memory based on flip-flops using the NOT-AND or NOT-OR operation). Such a digital computer is said to be Turing-complete or computationally universal. A computer, whether or not it is a digital computer, typically comprises many modules.

As used herein, the term "software" or "program" signifies one or more algorithms and data structures that configure an information processing device for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of instruction and data that configure the information processing device to achieve a specific result, for example, to perform word processing operations, or to encrypt a set of data.

As used herein, the term "programming language" signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from an information storage device. The computer typically has a device for reading storage media that is used to transport the software, or has an interface device that receives the software over a network.

Technology Specific General Computer Explanation

FIGS. 10A, 10B and 10C are simplified block diagrams of a computer system suitable for generating and verifying circuit designs using the multi-dimensional constraint solver of the present invention. Computer system 3110 typically includes at least one computer or processor 3114 which communicates with a number of peripheral devices via bus subsystem 3112. These peripheral devices may include a storage subsystem 3124, comprising a memory subsystem 3126 and a file storage subsystem 3128, user interface input devices 3122, user interface output devices 3120, and a network interface subsystem 3116. The input and output devices allow user interaction with computer system 3110.

The computer system may be a server computer, a client computer, a workstation, a mainframe, a personal computer (PC), a tablet PC, a set-top box (STB), a personal digital assistant (PDA), a cellular telephone, a smartphone, a web appliance, a television, a network router, switch or bridge, or any data processing machine capable of executing instructions (sequential or otherwise) that specify actions to be taken by that machine. Innovations, embodiments and/or examples of the claimed inventions are neither limited to conventional computer applications nor the programmable apparatus that run them. To illustrate, the innovations, embodiments and/or examples of the claimed inventions can include an optical computer, quantum computer, analog computer, or the like. Aspects of the present invention are well suited to multi-processor or multi-core systems and may use or be implemented in distributed or remote systems. Processor here is used in the broadest sense to include singular processors and multi-core or multi-processor arrays, including graphic processing units, digital signal processors, digital processors and combinations of these elements. Further, while only a single computer system or a single machine may be illustrated, the use of a singular form of such terms shall also signify any collection of computer systems or machines that individually or jointly execute instructions to perform any one or more of the sets of instructions discussed herein. Due to the ever-changing nature of computers and networks, the description of computer system 3110 depicted in FIG. 10A is intended only as a specific example for purposes of illustrating the preferred embodiments. Many other configurations of computer system 3110 are possible having more or less components than the computer system depicted in FIG. 10A.

Network interface subsystem 3116 provides an interface to outside networks, including an interface to communication network 3118, and is coupled via communication network 3118 to corresponding interface devices in other computer systems or machines. Communication network 3118 may comprise many interconnected computer systems, machines and communication links. These communication links may be wireline links, optical links, wireless links, or any other devices for communication of information. Communication network 3118 can be any suitable computer network, for example the Internet.

User interface input devices 3122 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 3110 or onto communication network 3118. User interface output devices 3120 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide nonvisual display such as via audio output devices. In general, use of the term "output device" is intended to include all possible types of devices and ways to output information from computer system 3110 to the user or to another machine or computer system.

Memory subsystem 3126 typically includes a number of memories including a main random access memory (RAM) 3130 for storage of instructions and data during program execution and a read only memory (ROM) 3132 in which fixed instructions are stored. In one embodiment, RAM 3130 also serves to store the various tools, libraries and other data utilized during execution of the power consumption analysis method described herein. File storage subsystem 3128 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 3128. Bus subsystem 3112 provides a device for letting the various components and subsystems of computer system 3110 communicate with each other as intended. Although bus subsystem 3112 is shown schematically as a single bus, alternative embodiments of the bus subsystem may use multiple busses.

When configured to execute an EDA software tool including the power simulation tools described herein, computer system 3110 depicted in FIG. 10A represents an electronic structure suitable for creating a circuit design. FIG. 10B shows a memory 3140 such as a non-transitory, computer readable data storage medium associated with file storage subsystem 3128, and/or with network interface subsystem 3116, and includes a data structure 3180 specifying a circuit design describing an integrated circuit. The memory 3140 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light). FIG. 10C is a block representing an IC 3190 designed and fabricated in accordance with the processes described above, where circuit 3190 is fabricated in accordance with the circuit design of data structure 3180 (see FIG. 10B).

The foregoing Detailed Description signifies in isolation individual features, structures or characteristics described herein and any combination of two or more such features, structures or characteristics, to the extent that such features, structures or characteristics or combinations thereof are based on the present specification as a whole in light of the knowledge of a person skilled in the art, irrespective of whether such features, structures or characteristics, or combinations thereof, solve any problems disclosed herein, and without limitation to the scope of the claims. When an embodiment of a claimed invention comprises a particular feature, structure, or characteristic, it is within the knowledge of a person skilled in the art to use such feature, structure, or characteristic in connection with other embodiments whether or not explicitly described.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein were chosen and described to signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

The invention claimed is:

1. A computer-implemented method for modeling the propagation of glitches along a signal path through a plurality of cells during simulation of a circuit design, each said cell including a logic function that is configured to generate output signal pulses on an output node in response to corresponding input signal pulses received on an input node, the method comprising:
    determining an input duration of said each input signal pulse transmitted on a first section of said signal path to said input node of said each cell, the input duration being a time period between a first arrival time of a first edge of said each input signal pulse at the input node and a second arrival time of a second edge of said each input signal pulse at the input node;
    utilizing said determined input duration to identify when said each input signal pulse is a scalable glitch;
    assigning a scaling factor value to said each input signal pulse that is identified as a scalable glitch; and
    controlling said each cell such that an output duration of an output pulse signal generated in response to said identified scalable glitch and passed from said output node on a second section of said signal path is determined by said input duration and said assigned scaling factor value.

2. The method of claim 1, further comprising calculating a scheduled output duration by multiplying the assigned scaling factor value and said determined input duration, wherein controlling said each cell comprises limiting said output duration by forcing a termination of said output pulse signal during an output suppression period determined by said scheduled output duration.

3. The method of claim 2, further comprising modifying said circuit design to include a glitch scaling module that is operably coupled in parallel with said logic function between said input node and said output node of said each cell.

4. The method of claim 3, wherein said glitch scaling module comprises:
    a glitch detector configured to identify said each input signal pulse as a scalable glitch by comparing said input duration with one or more stored glitch duration values;
    a scaled duration calculator configured to generate said scheduled output duration by multiplying said input duration and said scaling factor value; and
    a cell output controller configured to control said each cell by scheduling said output suppression period using the scheduled output duration and a delay period of said each cell.

5. The method of claim 2, wherein determining the input duration of said each input pulse signal further comprises:
    detecting a first arrival time of the first edge at the input node;
    detecting a second arrival time of the second edge at the input nod; and
    generating the input duration by calculating a difference between the first and second arrival times.

6. The method of claim 2, wherein said utilizing said determined input duration comprises comparing said determined input duration with both a stored maximum glitch duration value and a stored minimum glitch duration value.

7. The method of claim 6, wherein assigning said scaling factor value comprises assigning an integer one value to said scaling factor value when said determined input duration is greater than said stored maximum glitch duration value.

8. The method of claim 7,
    wherein calculating said scheduled output duration comprises multiplying said determined input duration by said integer one value such that said scheduled output duration is equal to said determined input duration, and
    wherein controlling said each cell in response to said scheduled output duration value comprises allowing an entirety of an output signal generated by said logic function to pass from said output node onto said second section of said signal path.

9. The method of claim 6, wherein assigning said scaling factor value comprises assigning an integer zero value to said scaling factor value when said determined input duration is less than said stored minimum glitch duration value.

10. The method of claim 9,
    wherein calculating said scheduled output duration comprises multiplying said determined input duration by said integer zero value such that said scheduled output duration is equal to zero, and
    wherein controlling said each cell in response to said scheduled output duration value comprises suppressing an entirety of an output signal pulse generated by said logic function.

11. The method of claim 6, wherein assigning said scaling factor value comprises assigning a cell-specific fractional value between zero and one to said scaling factor value when said determined input duration is greater than said stored minimum glitch duration value and less than said stored maximum glitch duration value.

12. The method of claim 11,
    wherein calculating said scheduled output duration comprises multiplying said determined input duration by said cell-specific fractional value such that said scheduled output duration is equal to a corresponding fractional portion of said determined input duration, and
    wherein controlling said each cell in response to said scheduled output duration value comprises suppressing a terminal portion an output signal pulse generated by said logic function such that said output duration of said output pulse signal is equal to or less than said fractional portion.

13. A computer-implemented method comprising:
    simulating a circuit design including a cell having an input node and an output node respectively operably coupled to corresponding first and second sections of a signal path, said cell including a logic function configured to generate output signal pulses in response to corresponding input signal pulses transmitted on the first signal path section to said input node;
    modifying the circuit design to include a glitch scaling module connected in parallel with said logic function between said input node and said output node of said cell;
    performing a simulated operation of said circuit design such that a plurality of input signal pulses are transmitted on said first signal path section to the input node of the cell, and such that said glitch scaling module performs a glitch scaling process including:

determining an input duration of said each input signal pulse transmitted on a first section of said signal path to said input node of said cell;

utilizing said determined input duration to identify when said each input signal pulse is a glitch;

assigning a cell-type-specific scaling factor value to said each input signal pulse that is identified as a scalable glitch; and controlling said cell such that an output duration of an output pulse signal generated in response to said identified scalable glitch and passed from said output node on the second section of said signal path is determined by said input duration and said assigned cell-type-specific scaling factor value.

14. The method of claim 13, wherein performing a simulated operation further comprises generating a toggle count including a total number of output signal pulses generated by said cell on said second signal line path.

15. The method of claim 13, wherein the circuit design includes a plurality of cells including a first cell of a first cell type, a second cell of a second cell type, and a third cell of the second cell type, wherein said modifying the circuit design comprises modifying said plurality of cells such that each said modified cell includes an associated glitch scaling module connected between a corresponding input node and a corresponding output node of said each modified cell, and wherein performing said simulated operation includes causing said plurality of glitch scaling modules to perform said glitch scaling process such that each modified cell propagates scalable glitches in accordance with an associated said assigned cell-type-specific scaling factor value, whereby the modified first cell propagates scalable glitches in accordance with an assigned first cell-type-specific scaling factor value, and said modified second cell and said modified third cell propagate scalable glitches in accordance with an assigned second cell-type-specific scaling factor value, said second cell-type-specific scaling factor value being different from said first cell-type-specific scaling factor value.

16. The method of claim 15, wherein each said associated glitch scaling module comprises:

a glitch detector configured to identify said each input signal pulse as a scalable glitch by comparing said input duration with one or more stored glitch duration values;

a scaled duration calculator configured to generate said scheduled output duration by multiplying said input duration and said scaling factor value; and a cell output controller configured to control said cell by scheduling said output suppression period using the scheduled output duration and a delay period of said cell.

17. The method of claim 13, wherein said glitch scaling process further comprises calculating a scheduled output duration by multiplying the assigned cell-type-specific scaling factor value and said determined input duration, wherein controlling said cell comprises limiting said output duration by forcing a termination of said output pulse signal during an output suppression period determined by said scheduled output duration.

18. A non-transitory, computer-readable medium comprising stored instructions configured such that, when the stored instructions are executed by a processor, cause the processor to execute operations including:

simulating a circuit design including a cell having an input node and an output node respectively operably coupled to corresponding first and second sections of a signal path, said cell including a logic function configured to generate output signal pulses in response to corresponding input signal pulses transmitted on the first signal path section to said input node;

modifying the circuit design to include a glitch scaling module connected in parallel with said logic function between said input node and said output node of said cell;

performing a simulated operation of said circuit design such that a plurality of input signal pulses are transmitted on said first signal path section to the input node of the cell, and such that said glitch scaling module performs a glitch scaling process including:

determining an input duration of said each input signal pulse transmitted on a first section of said signal path to said input node of said cell;

utilizing said determined input duration to identify when said each input signal pulse is a glitch;

assigning a cell-type-specific scaling factor value to said each input signal pulse that is identified as a scalable glitch; and controlling said cell such that an output duration of an output pulse signal generated in response to said identified scalable glitch and passed from said output node on the second section of said signal path is determined by said input duration and said assigned cell-type-specific scaling factor value, and generating toggle count including a total number of output signal pulses generated by said cell on said second signal line path.

* * * * *